US012753648B2

(12) United States Patent
Ion

(10) Patent No.: US 12,753,648 B2
(45) Date of Patent: Oct. 6, 2026

(54) DOOR CONTROL SYSTEM

(71) Applicant: Grigore Ion, Richmond Hill (CA)

(72) Inventor: Grigore Ion, Richmond Hill (CA)

( * ) Notice: Subject to any disclaimer, the term of this patent is extended or adjusted under 35 U.S.C. 154(b) by 0 days.

(21) Appl. No.: 19/186,939

(22) Filed: Apr. 23, 2025

(65) Prior Publication Data

US 2025/0327353 A1 Oct. 23, 2025

Related U.S. Application Data

(60) Provisional application No. 63/637,727, filed on Apr. 23, 2024.

(51) Int. Cl.
*E05F 15/668* (2015.01)

(52) U.S. Cl.
CPC ......... *E05F 15/668* (2015.01); *E05Y 2400/30* (2013.01); *E05Y 2400/36* (2013.01); *E05Y 2400/65* (2013.01); *E05Y 2900/106* (2013.01)

(58) Field of Classification Search
None
See application file for complete search history.

(56) References Cited

U.S. PATENT DOCUMENTS 7,151,351 B2 * 12/2006 Piechowiak ............ E05F 15/41 318/466
7,994,744 B2 * 8/2011 Chen ..................... F04D 25/088 318/400.03
8,525,457 B2 * 9/2013 Konig ....................... H02P 6/06 318/400.3
8,875,442 B2 * 11/2014 Sohn ..................... E05F 15/622 49/340
9,072,398 B2 * 7/2015 Choo .................. A47H 5/0325
9,217,272 B2 * 12/2015 Phillips ................... E05F 15/77
9,869,117 B2 * 1/2018 Houser .................. E05F 15/79
10,829,989 B2 * 11/2020 Rejc ...................... E05D 15/242
11,381,182 B2 * 7/2022 Yokozawa ................ H02P 6/06
11,417,200 B2 * 8/2022 Hass ....................... E05F 15/41
11,549,302 B2 * 1/2023 Lawhon .................. E05F 15/63
(Continued)

FOREIGN PATENT DOCUMENTS

CN 110952871 A * 4/2020 .............. E05F 15/77
CN 116291114 A * 6/2023 .............. E05F 15/70
(Continued)

OTHER PUBLICATIONS

European Search Report for EP 25171916 dated Sep. 8, 2025.
(Continued)

*Primary Examiner* — Catherine A Kelly
(74) *Attorney, Agent, or Firm* — Norton Rose Fulbright Canada LLP

(57) ABSTRACT

A door control system is provided. The control system includes a controller configured to control a door via a motor. The system may accept any input signal and transform the signal to a suitable input signal for the components of the system. The controller may receive commands to actuate the motor to effect movement in the door. The controller may transmit control signals to the motor and adjust the control signals based on the current speed. The system may include a switching element which may create a short circuit condition at motor terminals to effect braking. The system may include a feedback loop to adjust control signals sent to the motor.

19 Claims, 15 Drawing Sheets

(56) References Cited

U.S. PATENT DOCUMENTS

| | | | | |
|---|---|---|---|---|
| 11,851,936 | B2 * | 12/2023 | Cate | G07C 9/00896 |
| 12,158,037 | B2 * | 12/2024 | Ivanovic | G01C 19/00 |
| 2008/0185868 | A1 * | 8/2008 | Hubmann | E05F 15/70<br>296/146.1 |
| 2020/0141172 | A1 | 5/2020 | Ion | |

FOREIGN PATENT DOCUMENTS

| | | | | | |
|---|---|---|---|---|---|
| DE | 102012210592 | A1 | * | 12/2013 | E05F 15/70 |
| DE | 102020109961 | A1 | * | 10/2021 | E05F 15/70 |
| JP | 2014518966 | A | * | 8/2014 | G07C 9/21 |
| JP | 2018107960 | A | * | 7/2018 | H02P 6/17 |
| KR | 101194628 | B1 | | 10/2012 | |
| KR | 20190073833 | A | * | 6/2019 | E05F 15/611 |

OTHER PUBLICATIONS

Trusca et al., "Wireless low cost embedded solution for electrical motors control", Education and Research Conference (EDERC), 2012 5th European DSP, IEEE, Sep. 13, 2012, pp. 144-148.

* cited by examiner

DOOR CONTROL SYSTEM

CROSS-REFERENCE TO RELATED APPLICATIONS

This claims priority to, and the benefit of, U.S. Provisional Patent Application No. 63/637,727, filed Apr. 23, 2024, the entire contents of which are incorporated herein by reference.

FIELD

This relates to door control systems, and in particular to systems and methods for improving automated door control systems.

BACKGROUND

Doors are common and come in many forms. Some doors open on a vertical axis of rotation (e.g. entrances into rooms). Other door types, such as so-called "garage doors", include a plurality of panels and open by being moved along a track, often with the aid of rollers. For example, a "garage door" may be opened manually by applying a force to one or more panels of the door at one or more locations on the door to cause the door to move along the track in either direction.

Automated systems may be used to open and close, or otherwise control the position of, various types of doors. For example, automated door control systems often use AC motors for garage door opening systems. In such systems, the AC motor pulls a belt, chain, or other connector which is connected directly or indirectly to one or more panels of the garage door, thereby imparting a tensile force via the connector.

However, such automated systems require complicated control systems and electronics to activate the AC motor. Moreover, significant customization may be required to accommodate different models of motors having different ratings and operating parameters.

Accordingly, it would be beneficial to alleviate one or more of the above-noted challenges.

SUMMARY

According to an aspect, there is provided a method of operating a door control system having a motor coupled to a door, the method comprising: receiving, at a controller, a target speed for moving said door; receiving, at said controller, a command for moving said door in a first direction; moving said door, wherein moving said door comprises: transmitting a control signal to said motor to actuate said motor; receiving, at said controller, from an encoder coupled to said motor, a current speed; adjusting, by said controller, said control signal based on said target speed and said current speed; and transmitting said adjusted control signal to said motor.

According to another aspect, there is provided a door control system comprising: a door; a motor coupled to said door; an encoder coupled to said door; a controller configured to: receive a command to move said door; transmit a control signal to actuate said motor to effect movement of said door; receive a current speed of said door from said encoder; adjust said control signal based on said current speed and a target speed; and transmit said adjusted control signal to said motor.

According to still another aspect, there is provided a method of operating a door control system having a motor coupled to a door, the method comprising: receiving, at a controller, a target speed for moving said door; receiving, at said controller, a command for moving said door in a first direction; effecting movement of said door, wherein effecting movement of said door comprises: transmitting a control signal to actuate said motor; receiving, at said controller, from an encoder coupled to said motor, a current speed; adjusting, by said controller, said control signal based on said target speed and said current speed; and transmitting said adjusted control signal to said motor.

Some embodiments described herein may further comprise providing an input voltage to said door control system.

In some embodiments, said input voltage is an Alternating Current (AC) input signal, and said method further comprises converting said AC input signal to a DC input signal.

Some embodiments described herein may further comprise transforming, by a power supply circuit, said DC input signal to a transformed DC signal having a magnitude suitable for at least one of said controller and/or said encoder.

In some embodiments, adjusting said control signal may comprise one of: increasing an average magnitude of said control signal when said current speed is less than said target speed; and decreasing an average magnitude of said control signal when said current speed is greater than said target speed.

In some embodiments, said motor is a DC motor, and said DC motor comprises a switching element configured to switch to a short circuit condition at terminals of said motor, and said controller is configured to activate said switching element to effect braking when a magnitude of said current speed exceeds said target speed by greater than a threshold amount.

In some embodiments, said DC input signal has a range of 50 V to 1000 V DC.

In some embodiments, the transformed DC signal has a magnitude of 24 V.

In some embodiments, the input voltage is a three-phase AC signal, and the three-phase AC signal has voltages between 208 V and 600 V.

Some embodiments described herein may further comprise: after said transmitting of said adjusted control signal to said motor, receiving, at said controller, a subsequent current speed; and adjusting said control signal based on said target speed and said subsequent current speed.

Some embodiments described herein may further comprise: after said transmitting of said adjusted control signal, receiving, at said controller, a subsequent current speed, and wherein said controller is configured to deactivate said switching element to remove said short circuit condition based on said subsequent current speed and said target speed.

Some embodiments described herein may further comprise displaying said current speed on a display coupled to said controller.

In some embodiments, said current speed is one of a linear speed and angular speed.

In some embodiments, increasing said average magnitude of said control signal comprises adjusting a duty cycle of said control signal.

In some embodiments, said DC input signal is provided to said motor.

In accordance with still another aspect, there is provided a door control system comprising: a door; a motor coupled to said door; an encoder coupled to said door; a controller configured to: receive a command to move said door; transmit a control signal to actuate said motor to effect movement of said door; receive a current speed of said door from said encoder; adjust said control signal based on said current speed and a target speed; and transmit said adjusted control signal to said motor.

Some embodiments of the door control system as described herein may further comprise a power supply circuit configured to receive an input voltage, isolate said door control system components from said input voltage, and transform said input voltage to a transformed DC signal having a magnitude suitable for said controller and/or said motor.

In some embodiments, adjusting said control signal comprises one of: increasing an average magnitude of said control signal when said current speed is less than said target speed; and decreasing an average magnitude of said control signal when said current speed is greater than said target speed.

Some embodiments of the door control system as described herein may further comprise a switching element configured to, when activated, cause a short circuit condition at terminals of said motor to effect braking.

In some embodiments, said controller is configured to activate said switching element when a magnitude of said current speed exceeds said target speed by greater than a threshold amount.

Other features will become apparent from the drawings in conjunction with the following description.

BRIEF DESCRIPTION OF DRAWINGS

In the figures which illustrate example embodiments.

DETAILED DESCRIPTION

Figure 1A:
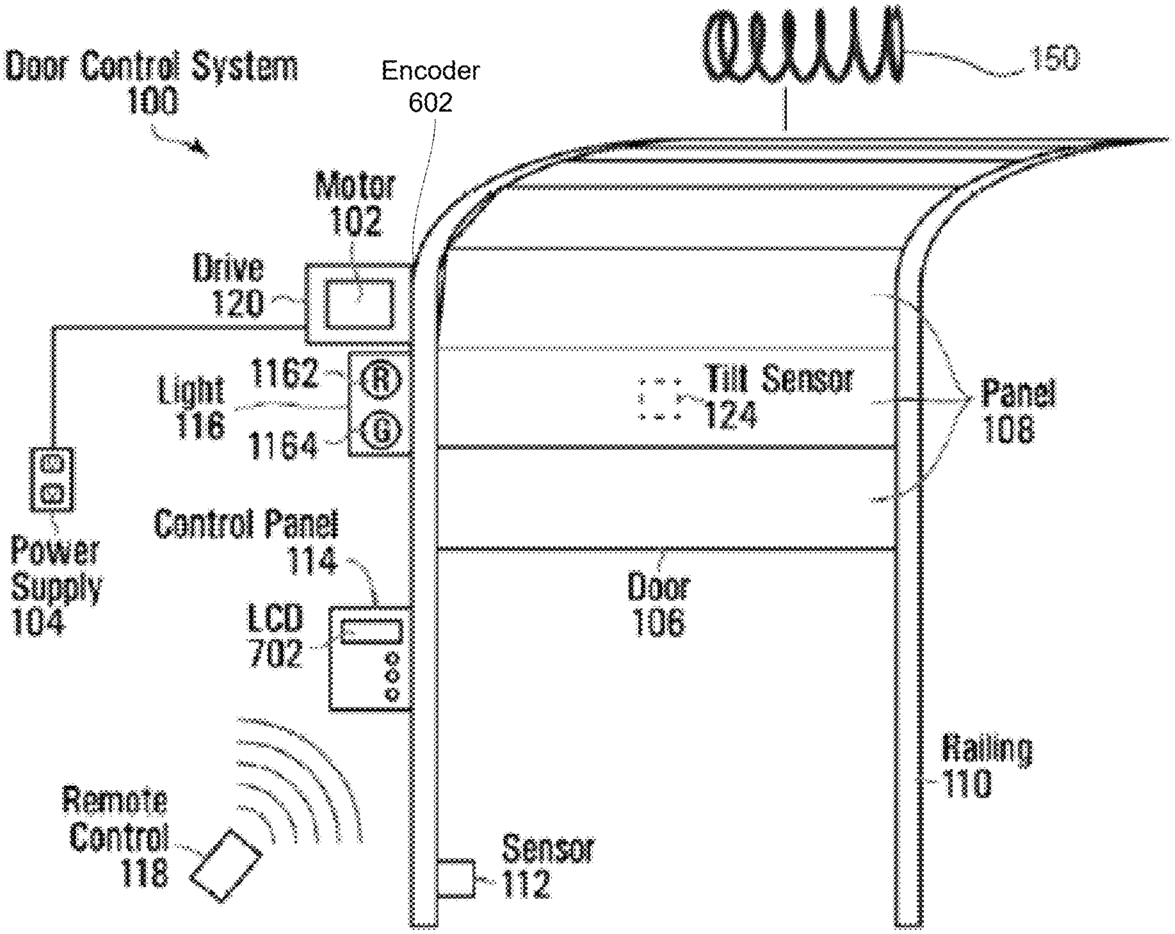
FIG. 1A is a schematic diagram showing components of an example door control system.

FIG. 1A is a schematic diagram showing components of an example door control system. As depicted, door control system 100 includes a door 106 comprising a plurality of panels 108. In some embodiments, though not depicted in FIG. 1, door 106 might include one panel. Door 106 is slidingly or connected by wheel bearings to railing 110, which provides a path for door 106 or panels 108 of door 106 to move up or down along the track provided by railing 110. In some embodiments, such motion may occur via bearings which allow for rotation along railing 110.

Also depicted is drive 120, which includes motor 102. In some embodiments, motor 102 is a DC motor. In some embodiments, motor 102 is a brushed DC motor. In some embodiments, the drive 120 and motor 102 form part of an integrated package. In other embodiments, the drive 120 may be separate from motor 102. Motor 102 is coupled to one or more panels of door 106, such that actuation of motor 102 causes door 106 to move along railing 110. Door 106 may move in a first vertical direction (e.g. vertically upward along the vertical section of railing 110) or a second vertical direction (e.g. vertically downward along the vertical section of railing 110).

Figure 1B:
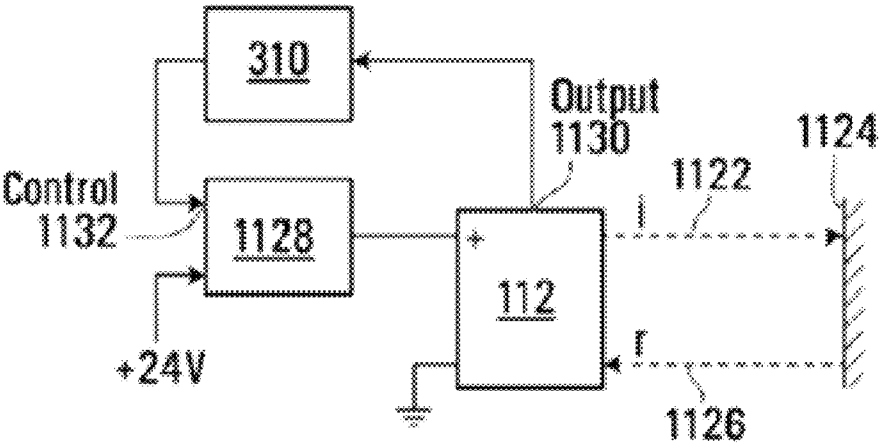
FIG. 1B is a simplified diagram depicting operation of an example photo eye sensor.
Figure 1C:
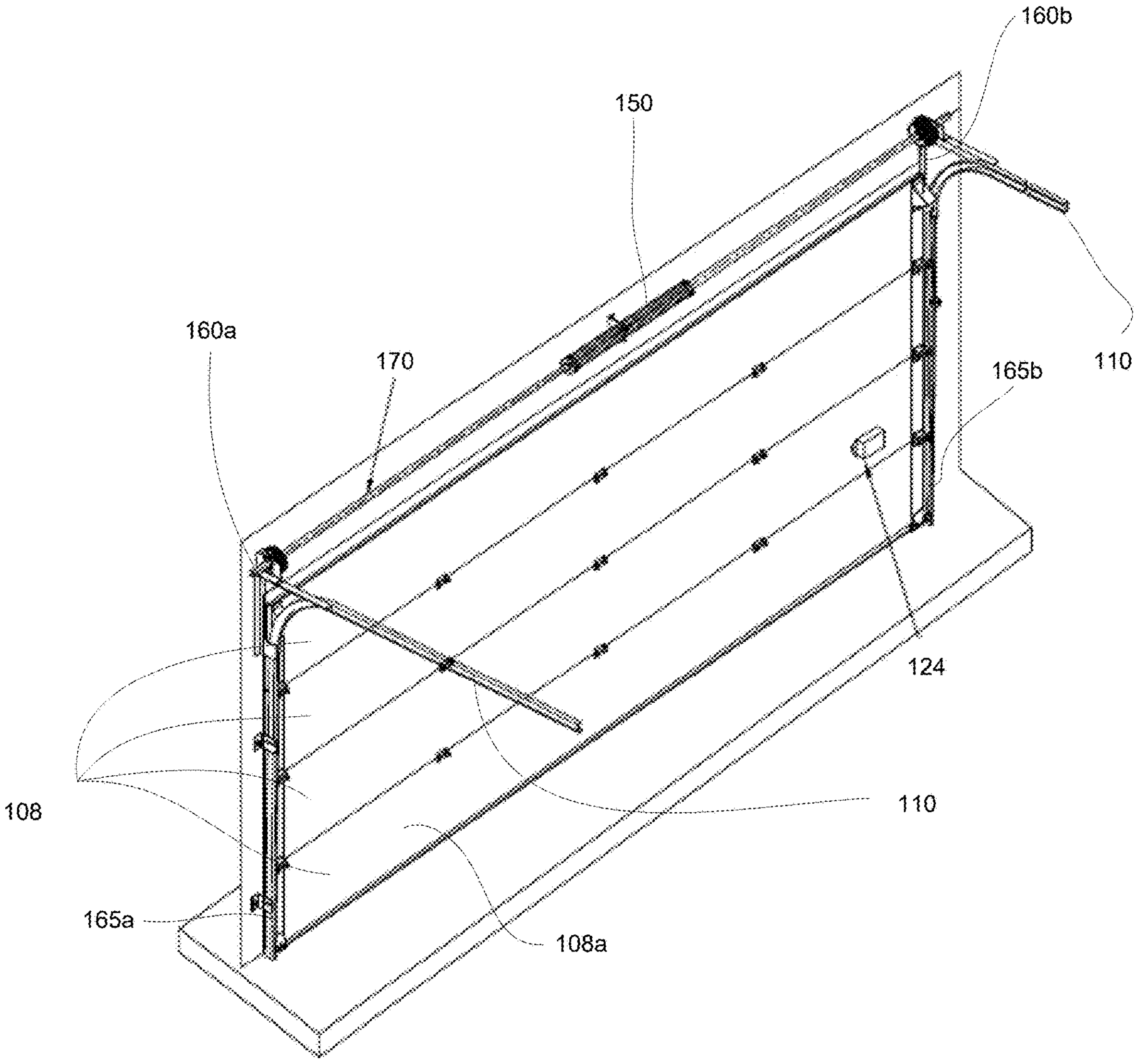
FIG. 1C is a perspective view of an example door control system.
Figure 1D:
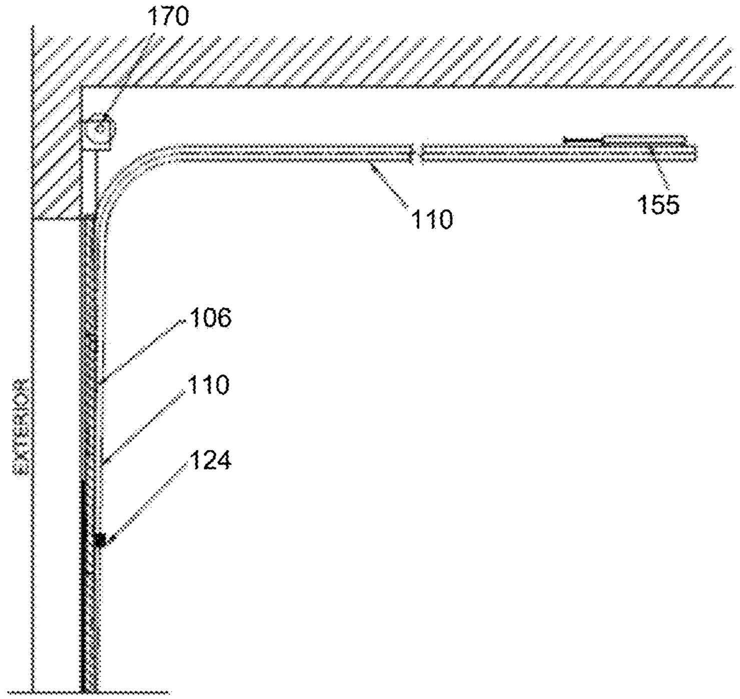
FIG. 1D is a simplified schematic diagram depicting a door coupled to a motor via cables in an closed configuration.
Figure 1E:
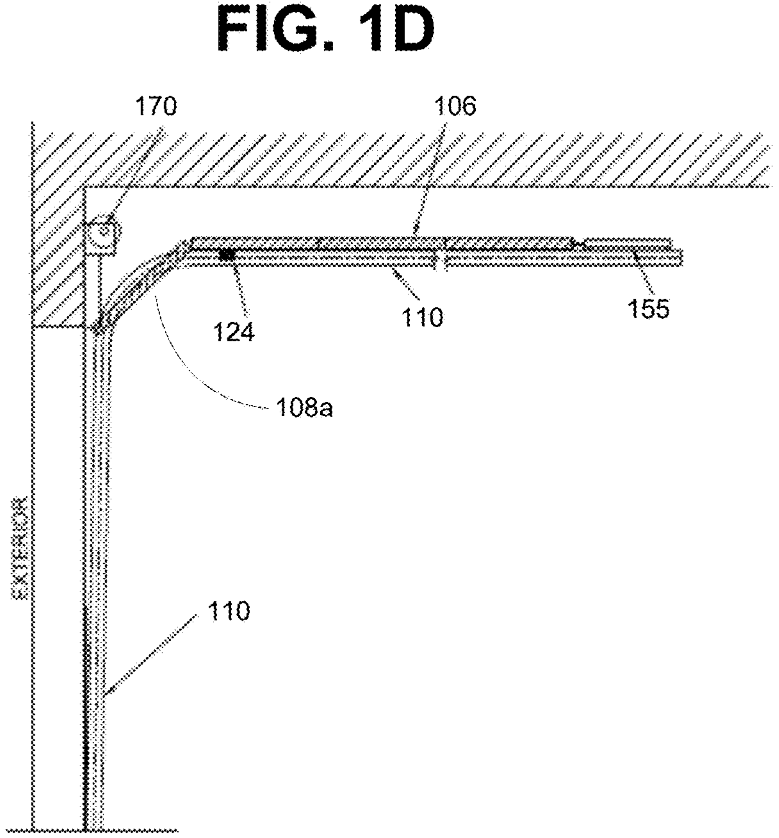
FIG. 1E is a simplified schematic diagram depicting a door couples to a motor via cables in an open configuration.

In some embodiments, railing 110 may transition from a substantially vertical orientation to a substantially horizontal orientation (as depicted in FIGS. 1D and 1E). This may be advantageous when, for example, there is limited vertical space above the opening of the door. In such configurations, as door 106 is moved upward along railing 110, some panels 108 of the door may be moving vertically upward (as depicted in FIG. 1D), while one or more other panels 108 of the door which are positioned vertically higher (when in the closed position) may be oriented and/or moving horizontally along railing 110 (as depicted in FIG. 1E). Of course, some panels may be oriented and/or moving at an angle somewhere between horizontal and vertical (as shown, for example, by panel 108*a* in FIG. 1E), depending on the degree to which the angle of the railing transitions from vertical to horizontal. In some embodiments, a pusher spring 155 may be included at an end of the horizontal component of the railing 110 in order to provide a biasing force such that at least one panel 108 of door 106 is not completely horizontal and thus subject to a gravitational force which can assist with transitioning to the closed configuration of door control system 100.

Motor 102 may be controlled by drive 120. Drive 120 may be a DC drive. That is, drive 120 may be a DC motor speed control system. The speed of a DC motor may be directly proportional to armature voltage and inversely proportional to motor flux (which is a function of field current), and as such, armature voltage and/or field current may be used to control the speed of a DC motor. Drive 120 may provide the requisite electronics to provide fine grain control over the speed of rotation and direction of motor 102. In some embodiments, drive 120 may be located at a vertical height which is out of reach of human operators (e.g. 8 feet or even higher). This may enhance the safety of door control system 100, as higher voltages and currents are kept out of reach from human operators, and from children.

As depicted in FIG. 1A, spring 150 may provide a tensile force to door 106 via door shaft 170 which may reduce or "balance" the effective weight of door 106. That is, although door 106 may have a mass in excess of 50 kilograms (which may be a significant load for motor 102 to pull against the force of gravity), spring 150 may exert a force on door 106 via drive shaft 170 which reduces the net force experienced when moving door 106. That is, spring 150 may exert a tension force which may counteract the gravitational force acting on door 106, such that a force significantly less than the weight of the door 106 needs to be applied in order to initiate movement of door 106. In some embodiments, spring 150 may be a torsion spring, an extension spring, or any suitable spring which can be rotated or compressed to store elastic potential energy. A system having a spring 150 may be referred to herein as a "balanced system". A system that is spring-less (or a system that does not have any other form of door weight moderating system, such as a counterweight) may be referred to herein as an "unbalanced system".

The motor 102 may be coupled to door 106 in any number of ways. For example, motor 102 may be connected to a drive shaft which is coupled to a rope or cable 160 which is fastened to a panel 108 of door 106, such that actuation of motor 102 causes the cable 160 to exert an upward force to pull door 106 up, and actuation of motor 102 in the reverse direction reduces the tension in the cable and allows the downward force exerted by gravity on door 106 to guide the door 106 in a downward direction. In some embodiments, motor 102 may be coupled to the lowest panel 108*a* of door 106 (or to a location proximal to the lowest vertical portion of door 106 when in the closed position, in the case of doors which are a single panel 108). In some embodiments, such coupling may be achieved by connecting a rope or cable to a location 165 on the lowest panel 108*a* of the door. It will be appreciated that in other embodiments, the lowest panel 108*a* need not be used and that locations that are vertically higher than the lowest panel 108*a* (as depicted, for example in FIG. 1C) may be used as desired.

In some embodiments, motor 102 may be coupled to the door panel via drive shaft 170 and a plurality of ropes or cables 160*a*, 160*b*. For example, in some embodiments, a first rope or cable may be connected to one side of a panel 108, and a second rope or cable may be connected to a second side of the panel 108, as depicted in FIG. 1C. Such configurations may be useful for distributing the force and torque exerted by the motor 102 on drive shaft 170 in a more balanced way across multiple locations 165*a*, 165*b* on the panel 108, such that the risk of a panel becoming crooked, skewed or jammed is reduced during lifting. It will be appreciated that the aforementioned embodiment is merely an example and that in other embodiments, more than two ropes or cables 160, or one single rope or cable 160 may be used to couple motor 102 to door 106. In some embodiments, spring 150 may provide a biasing force to door 106, in order to reduce the amount of force necessary to be exerted by motor 102 (and therefore the amount of tension experienced in cables 160*a*, 160*b*) to effect vertically upward movement of door 106. In some embodiments, spring 150 may provide a biasing force to drive shaft 170 which is less than the weight of the door, such that the lowering the door may be accomplished with minimal work by motor 102 (aside from allowing for movement, rather than restricting cables 160*a*, 160*b*).

In other embodiments, motor 102 may engage one or more wheels coupled to the door 106, such that rotation of motor 102 in either direction causes door 106 to move up or down, respectively.

Drive 120 may receive commands from control panel 114. Control panel 114 is coupled to drive 120 and includes a plurality of buttons or other inputs. For example, as depicted, control panel includes an LCD display, an 'open' button 304, a 'close' button 306, and a 'stop' button 308. Engaging any of buttons 304, 306, 308 causes a control signal to be sent to drive 120 to control the operation of motor 102. As depicted, control panel 114 may include a transceiver which is configured to communicate with remote control 118. Remote control 118 may be used by a user to control door 106 when located away from or in lieu of using buttons 304, 306, 308.

Also depicted is optional light 116. Light 116 includes at least one visual indicator which may indicate a mode of operation of the door control system 100. As depicted, light 116 includes a red light 1162 and a green light 1164. In some embodiments, green light 1164 is illuminated when the door 106 is stationary. In some embodiments, red light 1162 is illuminated when the door 106 is in motion. In some embodiments, red light 1162 may intermittently flash while door 106 is in motion. Door control system 100 may also include an audio output device (not shown) which may be configured to, for example, output an audible sound while a particular light is illuminated or flashing. Audio device may output multiple different sounds in different situations (e.g. when door 106 is being opened, when door 106 is being closed, when an error condition is detected (as described below), and the like). Although light 116 is depicted as having two lights 1162, 1164, it will be appreciated that light 116 may include less than two lights (e.g. a single LED or other device capable of emitting multiple different colours) or more than two lights.

Door control system 100 may also include sensor 112, which is located near the floor. In some embodiments, sensor 112 is a photo eye sensor configured to detect the presence of an object. For example, if a person or another object is located in the path of door 106, the sensor 112 detects the presence of this object and prevents door 106 from being lowered, thus avoiding potential injury to the person, damage to the object, and damage to the door 106. FIG. 1B is a simplified schematic diagram depicting operation of a photo eye sensor.

As depicted in FIG. 1B, in some embodiments, sensor 112 may be powered via a controllable switch 1128. For example, as depicted, controller 310 may provide a signal to switch 1128 which may change the output of the switch from +24V (or any suitable voltage) to 0 V. As such, controller 310 may be configured to exercise control over the power source provided to sensor 112. In some embodiments, controller 310 may be configured to receive output signal 1130 from sensor 112, as described in further detail below.

Door control system 100 may further include a tilt sensor 124. In some embodiments, tilt sensor 124 may be used, for example, to perform one or more of a) detecting movement of door 106, b) detecting a tilt or misalignment in door 106 (e.g. if a component in system 100 is damaged), and/or c) unexpected movements or forces experienced by door 106 (e.g. movements when door 106 is expected to be stationary).

Door control system 100 is connected to power supply 104. In some embodiments, a connection to power supply 104 includes a connection to a wall outlet providing AC currents and voltages. In embodiments using AC power, the system 100 may include one or more rectifier circuits for converting AC to DC to the desired voltage and/or current for operation of one or more of drive 120, DC motor 102, control panel 114, sensor 112 and tilt sensor 124.

Figure 2A:
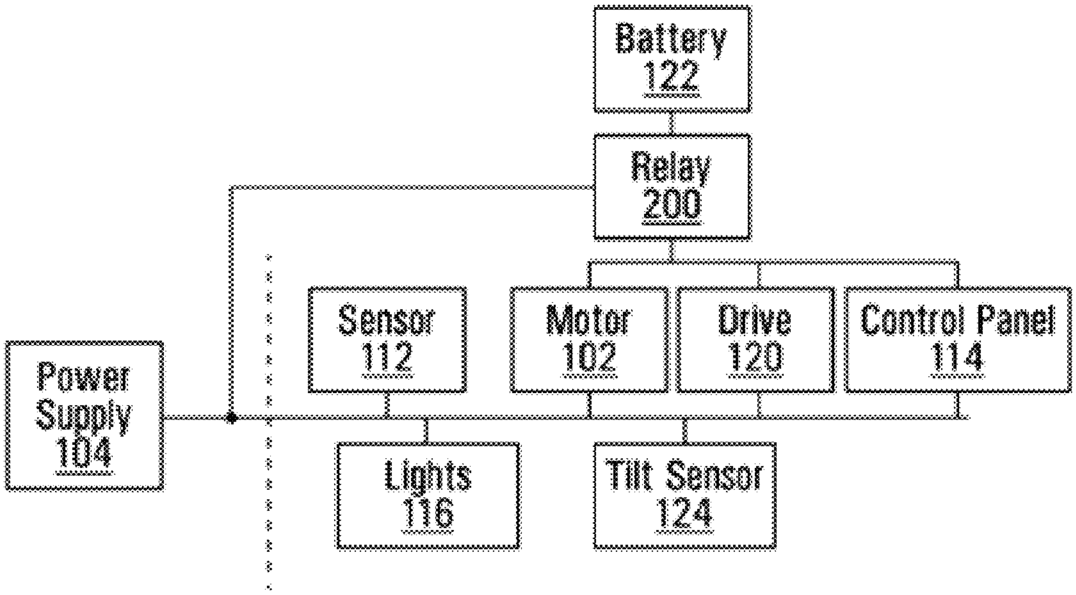
FIG. 2A is a block diagram showing electronic components of the door control system of FIG. 1A.

FIG. 2A is a block diagram illustrating example electronic components of the door control system 100 of FIG. 1A. As depicted, power supply 104 powers each of motor 102, drive 120, sensor 112, tilt sensor 124, lights 116, and control panel 114. In some embodiments, the AC power from power supply 104 is rectified prior to reaching the other components. In some embodiments, the control system 100 includes a sensor for verifying the locked/unlocked position of a mechanical door lock.

In some embodiments, door control system 100 may also include battery 122. Battery 122 is configured to provide DC voltage and current to system 100 in the event that power supply 104 is interrupted or unavailable. Battery 122 is connected to motor 102, drive 120 and certain components of control panel 114 via one or more relays 200. Relay 200 is energized by power supply 104, such that relay 200 acts as an open switch when power supply 104 is connected, ensuring battery 122 does not have any electrical connection to motor 102, drive 120 or control panel 114.

Figure 3:
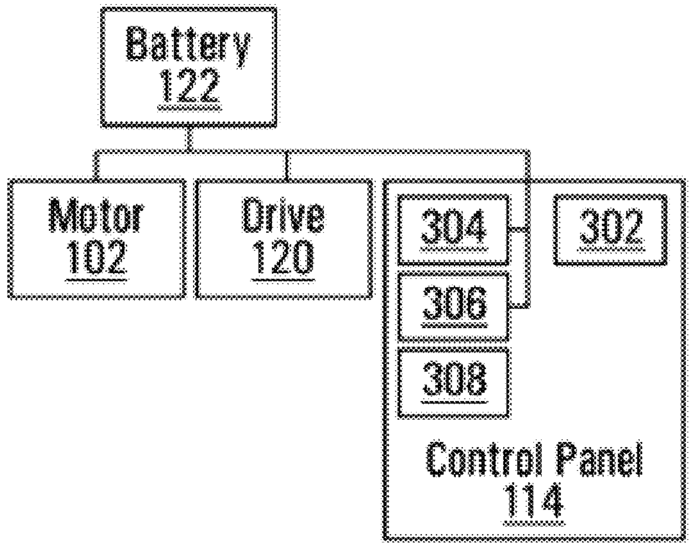
FIG. 3 depicts the electronic configuration of the door control system when the power supply is disconnected.

When power supply 104 is disconnected (e.g. in the event of a lightning strike, or a power failure), relay 200 is no longer energized and may assume a default position as a closed switch. FIG. 3 depicts an example electronic configuration of system 100 when power supply 104 is disconnected. As shown, battery 122 provides power to motor 102, drive 120, and to open button 304 and close button 306. Thus, when power supply 104 is disconnected, sensor 112, tilt sensor 124, and lights 116 are not powered, and most of the components in control panel 114 are not powered, with the exception of the open and close buttons 304, 306, and the associated circuitry for transmitting signals from the open and close buttons 304, 306 to the drive 120. Such a configuration may be particularly advantageous for reducing the power consumption from battery 122 during a power outage or interruption. For example, battery 122 provides power to specific components which are necessary to move the door up and down, but not to other components which would increase current draw and power consumption. In particular, the draw on battery 122 may be minimal when movement of door 106 is not required, thus allowing for operation without power supply 104 for much longer periods of time, relative to systems in which backup battery 122 is required to power additional peripherals e.g. sensors, lights, control panels, and the like). When motor 102 is a DC motor, such a configuration may be particularly advantageous, as control of DC motors (and in particular, brushed DC motors) may be less complicated relative to control of AC motors which are typically used. Moreover, power consumption by a brushed DC motor may be quite low, which further enhances the length of time for which battery 122 can be expected to provide power in the event of an outage.

Figure 4:
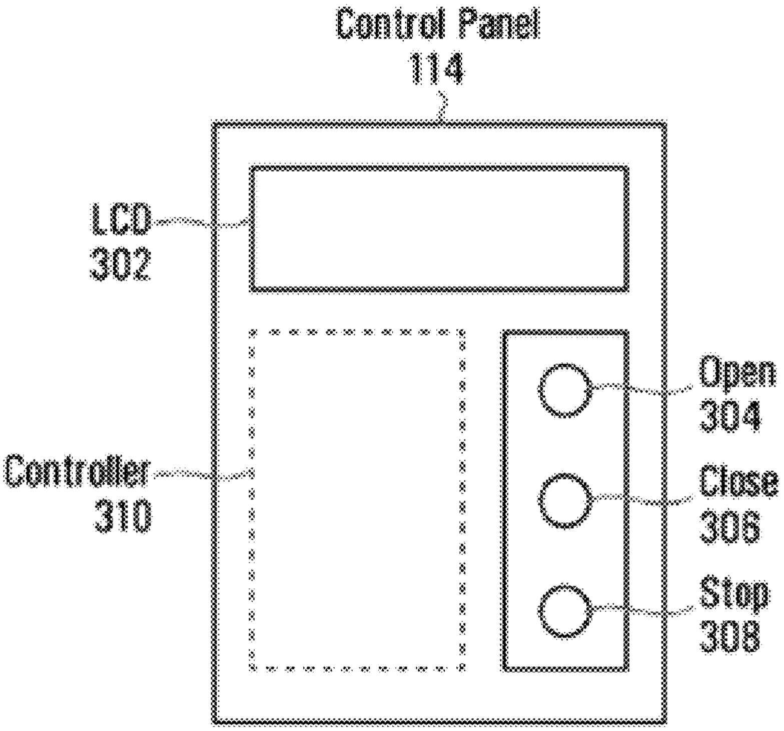
FIG. 4 is a front view of a control panel of an example door control system.

FIG. 4 is a front view of an example control panel 114. As shown control panel includes a display 302, open button 304, close button 306, stop button 308, all of which are connected to controller 310. Controller is operable to receive commands from buttons 304, 306, 308 and send instructions to one or more of display 302 and drive 120. In some embodiments, display 302 is a liquid crystal display (LCD).

Figure 5:
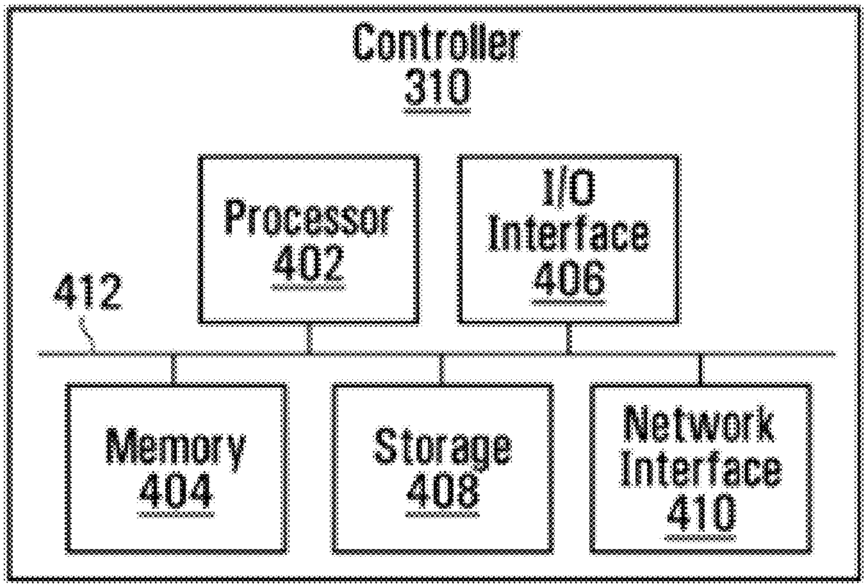
FIG. 5 is a schematic diagram showing components of an example controller.

FIG. 5 is a block diagram illustrating components of an example controller 310. As depicted, controller 310 includes one or more processors 402, memory 404, input/output interface 406, storage 408, and network controller 410, which are connected via a bus 412. In some embodiments, processor 402 of controller 310 executes instructions stored in memory 404 to implement a door control operating system. In some embodiments, system 100 includes a polarity-independent, two-wire power and communication bus 130 for communication between controller 310 and an encoder which provides reliable position and speed feedback data to the controller 310. In some embodiments, the polarity-independent, two-wire communication bus 130 may be used for communication between any of the control panel 114 and drive 120, as well as control panel 114 and any slave device (e.g. encoders, sensors, peripherals, lights, or the like).

Each of open button 304, close button 306 and stop button 308 are operable to be engaged or activated by a user. In some embodiments, the buttons 304, 306, 308 can be pushed in or depressed for engagement. In some embodiments, the buttons 304, 306, 308 are touch-sensitive buttons. When any of buttons 304, 306, 308 is engaged, a signal is sent to I/O interface 406 of controller 310. The signal(s) from the buttons 304, 306, 308 are received and processed by processor 402 to generate instructions for the drive 120 which controls DC motor 102.

In some embodiments, the controller 310 is programmable to execute predetermined operations based on a particular input or combination of inputs. For example, controller 310 may be configured to respond to a single press of open button 304 by sending a control signal to drive 120 to move door 106 in a first direction for a predetermined amount of time or processor cycles. In some embodiments, the control signal may specify the number of cycles for which the motor 102 should be actuated. The predetermined number of cycles or time period may correspond to a pre-configured change in vertical position for the door 106. Likewise, in some embodiments, controller 310 may be configured to respond to a single press of close button 306 by sending a control signal to drive 120 to move door 106 in a second direction for a predetermined amount of time or processor cycles. In some embodiments, the predetermined amount of time or processor cycles may be substantially the same for both open and close buttons 304, 306. Thus, system 100 is operable to allow a user to configure a preferred height for opening a closed door 106 with a single activation of the open button 304, as well as closing an open door 106 with a single activation of the close button 306. In some embodiments, activating the close button may cause the door 106 to close fully, irrespective of the starting height of the door. This may be achieved, for example, through the use of sensor 112 (e.g. by having sensor 112 positioned at a predetermined height near the ground, and when door 106 is detected by sensor 112, initiating a predetermined number of actuation cycles for motor 102 to by lowered by the remaining distance to the ground).

In embodiments in which the controller 310 is configured to move door 106 in either direction by a predetermined distance, activation of stop button 308 may cause a control signal to be sent to drive 120 which interrupts the current operation and results in motor 102 stopping and the door 106 remaining at its present height at the time of the stop command. In some embodiments, controller 310 may be configured to count the number of cycles which have been carried out for an open or close command, and re-applying the open or close button may result in a resumption of the previously executing open or close command.

In some embodiments, the controller may send individual control signals for each cycle, such that the motor 102 will stop rotating if the control signal from controller 310 to drive 120 is stopped or interrupted.

In some embodiments, the drive 120 may control the electrical signals which are sent to motor 102 in accordance with a duty cycle. For example, for each cycle, the motor 102 may be actuated for only a portion of the cycle. This results in the motor moving in 'pulses', as each clock cycle features a period of inactivity and a period of rotation by motor 102. In some embodiments, the speed at which the door 106 is opened or closed may be increased or decreased by modifying the duty cycle. That is, the armature voltage and current flux may be kept constant (thus ensuring the same speed of rotation of the motor 102), and the door may open or close faster because the duty cycle is increased (that is, the pulse of rotation for motor 102 is longer each cycle if the duty cycle is increased). Likewise, the door may appear to rise or fall more slowly if the duty cycle is decreased.

Although duty cycle adjustment may be used as a convenient and simple method for altering the speed of the door 106, it will be appreciated that the speed of motor 102 may also be adjusted by adjusting the armature voltage or current flux in the case of a DC motor.

As noted above, in some embodiments, door control system 100 includes sensor 112. In some embodiments, sensor 112 is a photo eye sensor. Sensor 112 may be any sensor which is configured to detect the presence of an object in close proximity. As depicted in the example configuration shown in FIG. 1A, sensor 112 is affixed to a railing 110 of system 100, normally within a metre or less from the ground. Sensor 112 is configured to detect the presence of an object in close proximity to the sensor 112 (as described, for example, in connection with FIG. 1B). The distance necessary for detection may vary depending on, for example, the scale of the door 106 in a particular application, as well as the particular needs for a system. For example, a door control system 100 being used for the transportation of fragile, expensive goods might use higher detection thresholds than a system used for a storefront.

Sensor 112 is typically placed along railing 110, in a location that allows sensor 112 to detect objects which are in the path of door 106. For example, a box that has been placed in the path of door 106 may be crushed by door 106 if the 'close' mechanism has been engaged by a user. When sensor 112 detects the presence of an object in the path of door 106, sensor 112 may send a signal 1130 to controller 310 indicating that an object is present. Controller 310 may be configured to take particular actions in response to receiving a signal indicative of the presence of an object in the way of door 106. For example, controller 310 may interrupt a 'close' operation if an object is detected. However, if the door control system 100 is currently engaged in an 'open' operation, the controller might not take any additional action when an object is detected by sensor 112 (as the object is unlikely to suffer damage by door 106 if the door is already in the process of being opened and being moved further away from the object).

In some embodiments, controller 310 may be further configured to illuminate one or more of lights 116 and/or sound an audio alert to indicate to nearby users that an object is blocking the path of door 106.

In some embodiments, when a command is received to actuate motor 102 (whether to move door 106 in the open direction or the closed direction), controller 310 may be configured to perform one or more comparisons based on the current reading(s) from one or more sensors, prior to actuating motor 102 in either direction.

Some door control systems may be required to confirm to regulations and/or standards in order to be acceptable for public consumption. For example, the UL 325 standard is a common safety standard with which some door control systems may be required to comply. In some embodiments, door control system 100 may incorporate specific algorithms in order to comply with various standards. In some embodiments, controller 310 may incorporate such algorithms into operations, such that little or no additional actions are required by the end user in order to comply with various safety standards.

It may be necessary for standard compliance purposes to verify once per cycle that the sensor 112 is functioning correctly. In some embodiments, sensor 112 is powered via a pin on controller 310 (or, as shown in FIG. 1B, by a controllable switch 1128 connected to a power source, which can be turned on and off via a control signal from controller 310). In some embodiments, the controller 310 may provide sensor 112 with a different voltage input relative to other peripherals connected to controller 310 (e.g. 24 Volts).

Figure 2B:
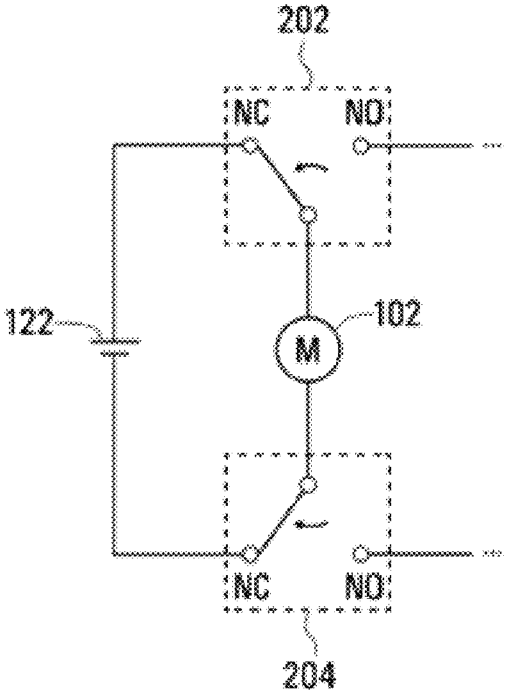
FIG. 2B is a simplified diagram depicting components of an example circuit.

Returning to FIG. 3, in some embodiments, door control system 100 is able to continue to functioning with reduced functionality in the event that power supply 104 is disconnected. As depicted, when power supply 104 is disconnected, relays 200 are no longer being energized by power supply 104, causing relays 200 to connect battery 122 as the power source for certain components in door control system 100. As shown, battery 122 provides power to motor 102, drive 120, as well as open and shut buttons 304, 306. As such, in some embodiments, when power supply 104 is disconnected, battery 122 might not provide power to any of sensor 112, tilt sensor 124, or lights 116, as well as display 302 and stop button 308 on control panel 114. FIG. 2B is a simplified circuit diagram illustrating an example configuration.

As depicted in FIG. 2B, relays 202, 204 may be configured to have a default position (depicted as "normally closed" or NC) in which battery 122 is connected to motor 102 when power supply 104 is unavailable. When power is provided by power supply 104, relays 202, 204 may be energized, thus causing relays 202, 204 to switch to the "normally open" or NO position, in which battery 122 is disconnected from other system components.

When powered by battery 122, the controller 310 in control panel 114 receives power for the components necessary to receive commands from open and close buttons 304, 306 and to send instructions to drive 120 to actuate motor 102. In some embodiments, motor 102 may be instructed directly by controller 310. Unlike full-power operation mode, the battery-powered operation mode does not make use of the predetermined door opening or closing lengths. That is, a single command from a user to open or close door 106 will not cause the door 106 to be opened to a predetermined height. Instead, the door control system 100 might not provide continuous motor function in the absence of active commands from the user.

In some embodiments, when powered by battery 122, pressing or activating the open button 304 and then releasing the button 304 will cause the door 106 to be raised for the length of time that the button 304 is activated. When button 304 is released, door 106 will stop being raised. Likewise, when door 106 is open (that is, when the bottom end of door 106 is vertically higher than the bottom of railing 110), pressing the close button 306 will cause the door to descend only while the close button 306 is being activated. The presence of battery 122 allows for the door control system 100 to maintain some basic functionality in emergencies (e.g. when there is a power failure, a lightning strike, or the like). It should be noted that sensor 112 is not powered by battery 122 and as such, method 600 described above might not be carried out by controller 310 while door 106 is being raised or lowered. However, in some embodiments, sensor 112 may be powered by battery 122 (although with continuous motor 102 operation disabled when in battery-powered mode, the likelihood of damage or injury would be lowered, because the user will be manually pressing the buttons 304, 306 in close proximity to the door assembly, without the possibility of the door continuing to move in the absence of active actions by the user).

Figure 6:
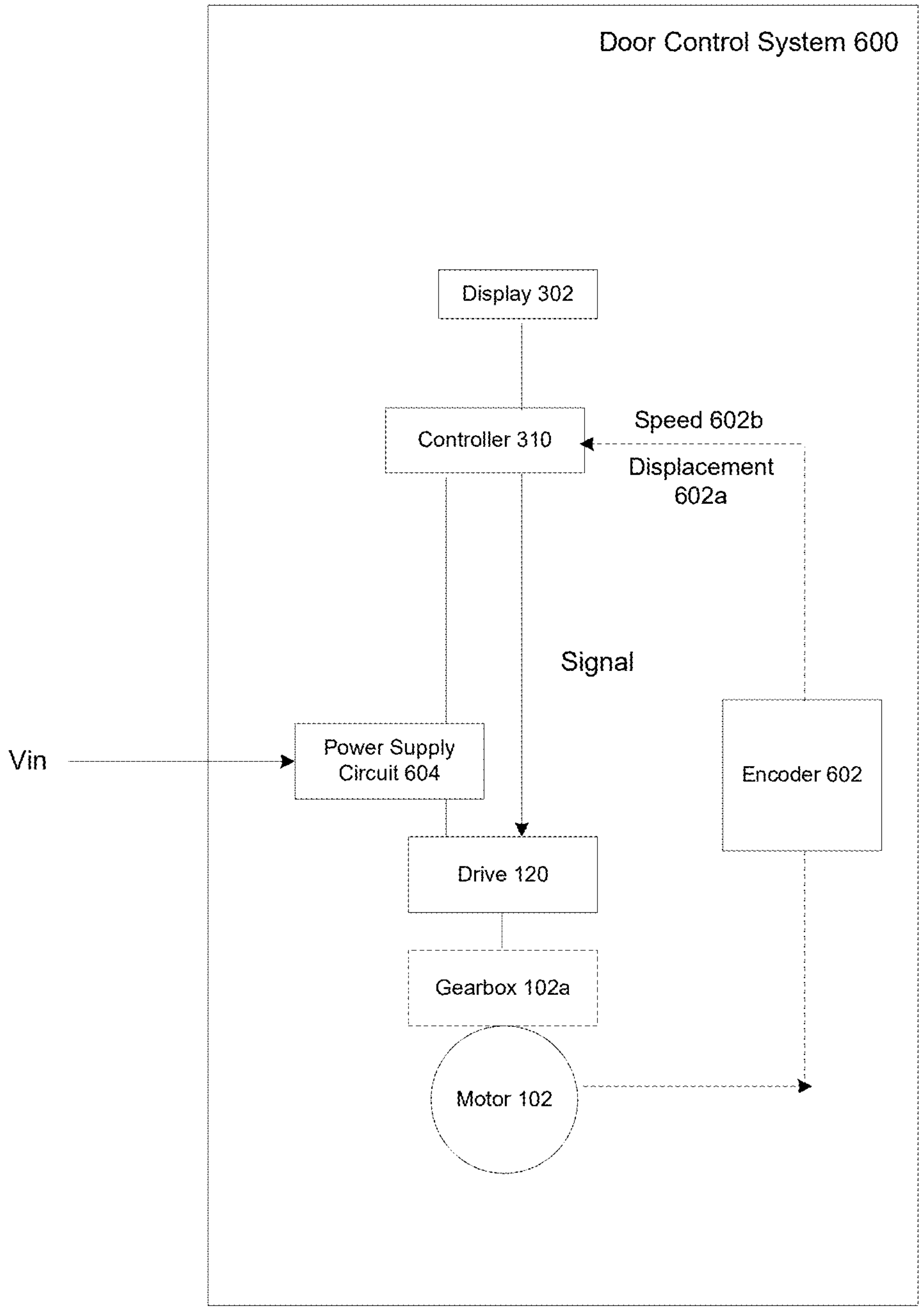
FIG. 6 is a simplified schematic diagram showing components of an example door control system, in accordance with some embodiments.

FIG. 6 is a block diagram depicting electronic components of an example of door control system 600, in accordance with some embodiments. For simplicity, certain components (e.g. lights 116, tilt sensor 124, relay 200, battery 122, and the like) have been omitted from FIG. 6 (as is also the case with the embodiments depicted in FIGS. 9 and 12). It should be appreciated that one or more of these components may be present in some embodiments.

As depicted, system 600 includes a controller 310, a display 302 connected to controller 310, a power supply circuit 604 coupled to controller 310 and drive 120, a motor 120 coupled to drive 120, and an encoder 602 coupled to motor 102 and controller 310. As depicted, system 600 may optionally include a gearbox 102*a* coupled to motor 102. The gearbox may provide a gear ratio to motor 102 (e.g. 30:1, 40:1, or the like) so as to convert individual rotations of motor 102 into larger (or smaller) turns.

In some embodiments, encoder 602 is operable to observe and/or measure changes in position, distance, and or speed. Many different types of encoders 602 may be suitable, such as optical encoders. An encoder 602 may function, for example, by being coupled to a moving part (e.g. a shaft of motor 102 or gearbox 102*a*, or to a cable) and rotating in tandem with that part. Modern encoders, such as digital encoders, may provide outputs including but not limited to position, distance, angular speed (e.g. revolutions per minute (RPM)), and/or linear speed (e.g. inches per second).

It will be appreciated that there are numerous suitable possible ways of determining these quantities using encoder 602. For example, coupling an encoder directly to a motor 102 shaft could provide an angular speed output from the encoder. Likewise, using well-known relationships from rotational dynamics, converting from angular speed to linear speed may be trivially accomplished provided the radius (e.g. of the gear coupled to motor 102) is known (e.g. linear speed=angular speed in radians per second×radius; linear distance=angular displacement in radians×radius, and the like).

In some embodiments, encoder 602 is coupled to motor 102 so as to provide a feedback loop from motor 102 and/or gearbox 102*a* to controller 310. Thus, controller 310 may be provided with a real-time or near-real-time linear speed, angular speed, and/or position of door 106. In some embodiments, controller 310 is configured to control the speed and/or position of door 106 via control signals sent to motor 102 via drive 120.

Figure 7A:
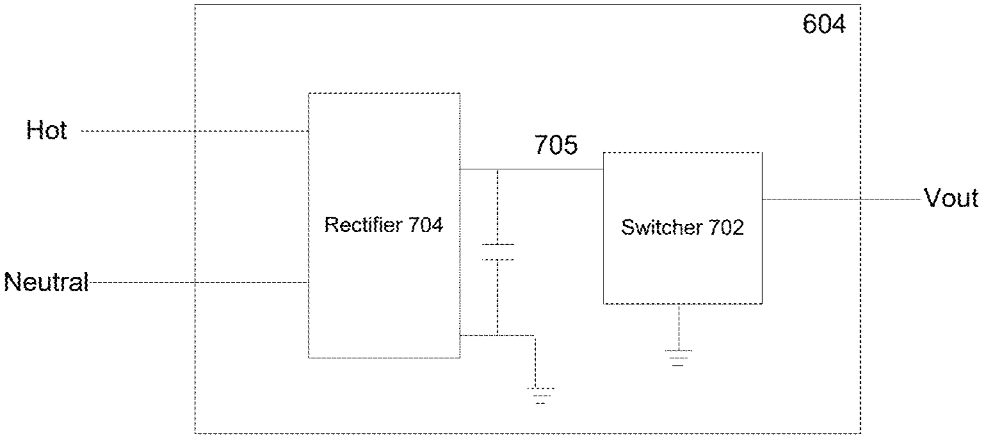
FIG. 7A depicts an expanded view of an example embodiment of power supply circuit 604 which accepts an AC input voltage.

In some embodiments, power supply circuit 604 may accept virtually any input voltage signal and provide electrical isolation from the remaining electrical components of system 600. FIG. 7A depicts an expanded view of an example embodiment of power supply circuit 604 which accepts an AC input voltage. As depicted, power supply circuit 604 includes switcher 702 and rectifier 704. In some embodiments, switcher 702 is configured to accept a DC voltage 705 as an input and output a DC voltage. In some embodiments, switcher 702 may be an integrated circuit (such as, for example, a Power Integrations 60 W Flyback Power Supply which uses the InnoSwitch3-AQ INN3949CQ Flyback Switcher IC for Automotive Applications) which may accept an input voltage range of 50V DC to a maximum of 1000 V DC. In some embodiments, switcher 702 may output 24V DC. In some embodiments, rectifier 704 may provide an output voltage in the range of 250 V to 900 V. In some embodiments, motor 102 may be powered by DC voltage 705.

It will be appreciated that although FIG. 7A includes a rectifier 704 (which converts AC to DC), in embodiments in which the input voltage is a DC signal, rectifier 704 may be omitted. As depicted, rectifier 704 may accept an AC input signal (for example, from the Hot and Neutral contacts of a wall outlet) and convert the AC signal to a DC voltage. In some embodiments, rectifier 704 is a bridge rectifier. In other embodiments, other types of rectifiers (e.g. Schottky rectifiers, full wave rectifiers, half wave rectifiers, controlled rectifiers, center-tapped full wave rectifiers, and the like) are contemplated.

Figure 7B:
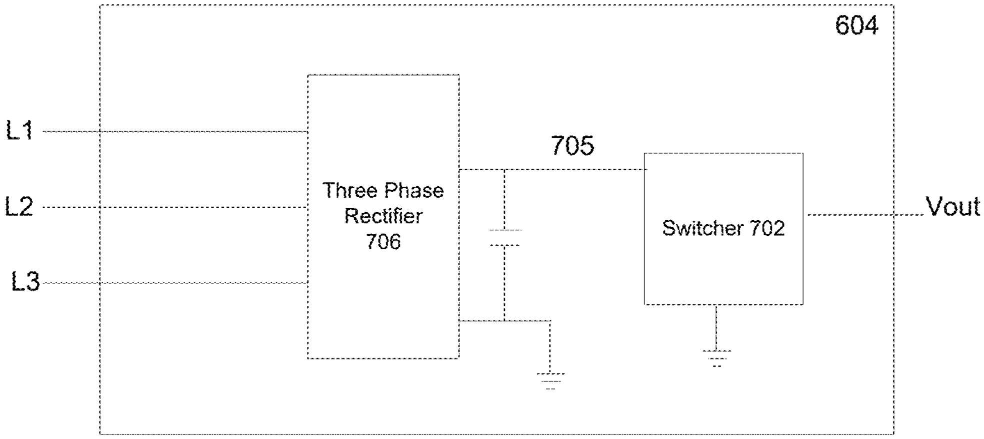
FIG. 7B depicts an expanded view of an example embodiment of power supply circuit 604 which accepts a 3-phase input voltage.
Figure 7C:
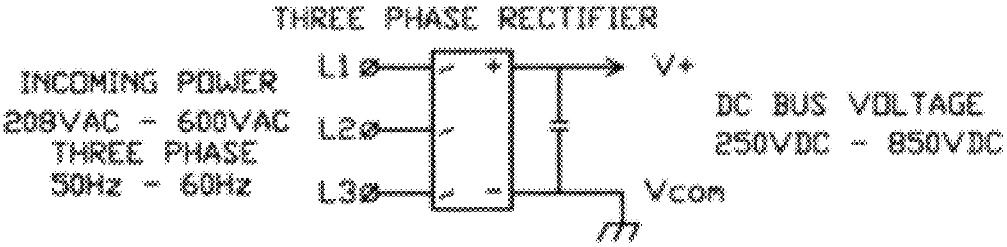
FIG. 7C depicts an example three phase rectifier circuit.

FIG. 7B depicts an expanded view of an example embodiment of power supply circuit 604 which accepts a 3-phase input voltage. Similar to the embodiment depicted in FIG. 7A, power supply circuit 604 includes switcher 702 which accepts an input voltage (for example, in the range of 50V to 1000 V DC) and outputs a DC voltage (e.g. 24 V DC). As depicted, the embodiment of FIG. 7B includes a three-phase rectifier 706 which is operable to accept 3-phase AC signals (e.g. line 1 L1, line 2 L2, and line 3 L3) as an input and output a single phase DC output signal 705. In some embodiments, three phase rectifier 706 is a three phase bridge rectifier. In other embodiments, three phase rectifier 706 may be a half wave circuit, a full-wave circuit using a center-tapped transformer, a full-wave bridge circuit, or the like. In both embodiments of FIGS. 7A and 7B, it will be appreciated that a capacitor C may be used to "smooth" any variations in DC output signal 705. FIG. 7C depicts an example embodiment of a three-phase rectifier circuit. As depicted, the input power may be a three-phase signal with a frequency between 50 Hz and 60 Hz, and a magnitude of 208 V AC to 600 V AC, and can be rectified to output an output DC bus voltage of between 250 V DC and 850 V DC.

Figure 9:
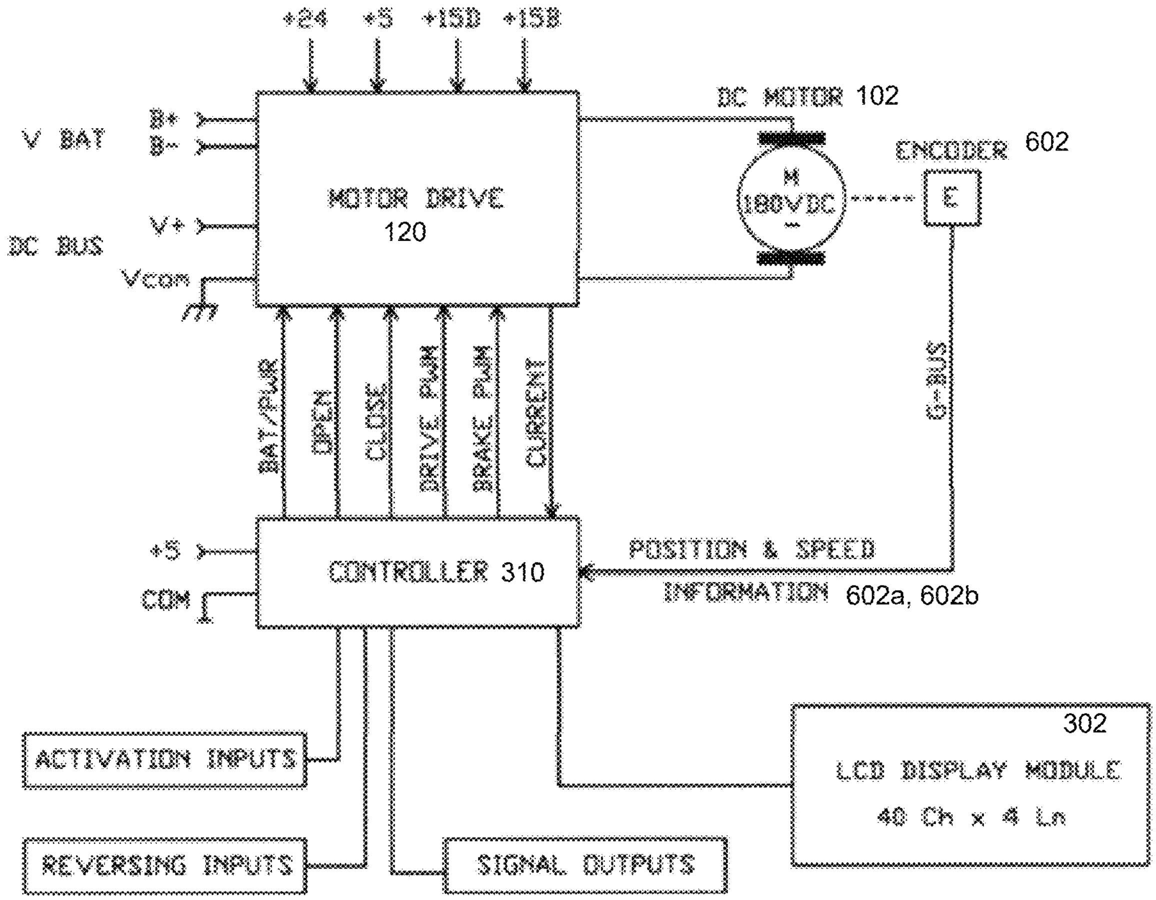
FIG. 9 is a simplified circuit diagram showing components of an example door control system, in accordance with some embodiments.

In some embodiments, system 600 may include a plurality of power supply circuits 604, each of which may be configured to provide distinct input signals for the system. For example, as depicted in the example system of FIG. 9, a plurality of power supply circuits 604 may be implemented to provide distinct inputs to motor drive 120 (e.g. a 24 V DC power supply, a 15 V DC drive power supply, and a 15V DC braking power supply). In some embodiments, motor 102 may be powered by the DC output signal (e.g., a DC signal having a voltage between about 200 V to 950 V DC). It will be appreciated that the embodiment depicted in FIG. 9 is an example embodiment and one or more components may be omitted and/or added to those depicted.

In some embodiments, the use of power supply circuit 604 may provide significant flexibility to the user of system 600. For example, it has been shown above that various embodiments may allow for any of a DV input voltage, an AC input voltage, and/or a 3-phase AC input voltage to be used with system 600. Given that power supply circuit 604 may be embodied as an integrated circuit which occupies a negligible amount of room on a circuit board, it is possible for some embodiments to support two or more of the above-noted input signals. For example, it is possible that an embodiment might include inputs for a DC input voltage, an AC input voltage, and a 3 phase AC input signal without the need for complex power electronics.

Moreover, it will be appreciated by those skilled in the art that complex power electronic setups are rife with opportunities for user error. For example, using a separate transformer, it is common for users to accidentally plug a wire into the wrong input. For example, a user might accidentally plug into a 600 V source rather than a 120 V source, which can result in unexpected equipment behaviour, damage to equipment, and various other negative consequences. Contrastingly, some embodiments described herein allow for system 600 to be power supply "agnostic". That is, system 600 may accommodate various types of input voltages and magnitudes somewhat seamlessly, without necessitating the re-calibration of various components and/or safety equipment. As such, in some embodiments system 600 may represent a robust improvement over previously known door control systems.

Returning to door control system 600 of FIG. 6, in some embodiments, power supply circuit 604 may be operable to accept an input signal Vin which may be any of DC, AC or three-phase AC and generate a suitable DC output for operation of other components in system 600 (e.g. a 24 V DC signal, a 5V DC signal, and the like). It will be appreciated that in some embodiments, the output DC signal of rectifier 705 (which may be anywhere in a range of about 200 V to 950 V DC) may be used to power motor 102, while the output of switcher 702 may be used to power other electronic components such as controller 310, encoder 602 and the like, as depicted in, for example, FIGS. 12 and 13. This may provide for enhanced flexibility and versatility in terms of how system 600 may be used. For example, system 600 can be incorporated virtually anywhere without the need for large power electronics (e.g. transformers) to pre-condition input signals for compatibility with system 600 and motor 102.

In some embodiments, system 600 may accept a desired or target speed from an operator of system 600. For example, a target speed might be measured in revolutions per minute (RPM). In other embodiments, a target speed might be measured in linear terms (e.g. inches per second, or the like). Some embodiments of system 600 are operable to accept a target speed from an operator and calibrate system 600 to move door 106 (whether in an upward or downward direction) in accordance with the target speed. For example, display 302 on control panel 114 might prompt an operator to enter a desired speed, and the operator may enter a desired speed via any suitable interface on control panel 114. In some embodiments, the target speed may be displayed on display 302. Displaying the target speed may be useful in providing an alert to subsequent operations as to the currently set operating parameters for system 600. In some embodiments, display 302 may display the current speed of the door while the door is in motion. This may be useful for calibration and testing, to confirm that the correct target speed is being achieved.

In some embodiments, system 600 may leverage the output data from encoder 602 to control the speed (whether angular or linear) of motor 102 and/or door 106. Modern encoders are configured to typically provide at least angular displacement 602*a* and/or angular speed 602*b* output signals. Moreover, if the gear ratio and/or drum size is known, an encoder can output linear position and/or linear speed. Moreover, modern encoders typically include a digital signal processor (DSP) which enables the encoder to provide updated outputs many times per second (as many as many thousands or more times per second). As such, controller 310 can be provided with real-time or near-real-time information as to the current speed of door 106 and/or motor 102.

In some embodiments, controller 310 may operate a feedback loop which continuously compares the current speed of the door 106 and/or motor 102 with the target speed provided by the operator. Of course, in some embodiments, controller 310 may not operate such a feedback loop when motor 102 and/or door 106 are stationary, although such a feedback loop could nevertheless be useful in confirming that the speed of the door is maintained at 0. In other embodiments, a feedback loop may in constant or periodic operation irrespective of whether the door 106 and/or motor 102 are in motion (so as to monitor whether door 106 and/or motor 102 are in motion when they should be stationary).

In some embodiments, controller 310 may control the operation of motor 102 by sending control signals to drive 120. In some embodiments, motor 102 is a DC motor. It should be appreciated that references herein to DC motors are not intended to be limiting and that some embodiments may incorporate other types of motors such as AC motors. Drive 120 may be a DC drive configured to feed electrical signals into motor 102 in varying amounts so as to control motor 102's speed and/or torque, whereas motor 102 typically receives control signals from drive 120 and generates rotational force in accordance with the received electrical control signals. In some embodiments, controller 310 may control the speed of motor 102 through the use of modulated control signals. In some embodiments, the speed of motor 102 may be controlled through the use of pulse width modulation (PWM). PWM is a commonly used method of controlling the average value of a signal (e.g. the voltage delivered to motor 102) by switching a supply between 0 and 100% (with the proportion of 'on' time in a cycle to the total duration of a cycle being referred to as a "duty cycle"). In some embodiments, the duty cycle signal may have a frequency between 1 kHz to 20 KHz. That is, the total time for one cycle may be on the order of 1 millisecond or less, thereby enabling very fine-grain control over the adjustment of the duty cycle as a feedback loop is in operation.

In some embodiments, drive 120 may include a plurality of input signals. For example, in the embodiment depicted in FIG. 9, drive 120 may accept a DC bus signal (e.g. which may be applied to motor 102), a battery signal, a +24 V power supply signal, a +15V DC drive power supply signal, a +15 V DC braking power supply signal, a +5 V DC power supply signal, as well as numerous control signals transmitted from controller 310, such as a battery/power signal, an open control signal, a close control signal, a drive PWM signal, and a braking PWM control signal, and drive 120 may output a current signal to controller 310 (e.g. a signal indicating the magnitude of current drawn by motor 102).

In some embodiments, controller 310 may send control signals to drive 120 which are then conditioned and passed from drive 120 to motor 102. In some embodiments, controller 310 may be configured to send a control signal indicating the desired speed to drive 120, and drive 120 may transform the desired speed to the appropriate duty cycle so as to achieve the desired speed. After sending the control signal to drive 120 and/or motor 102, controller 310 may then receive a 'current speed' 602*b* or 'current position' 602*a* signal from encoder 602, and adjust the subsequent control signals (as shown in FIG. 9) being sent to drive 120 and/or motor 102. For example, if the speed detected from encoder 602 is higher than the target speed, controller 310 may reduce the duty cycle of the control signal so as to reduce the speed of the motor. In another example, if the speed detected from encoder 602 is lower than the target speed, controller 310 may increase the duty cycle so as to increase the speed of the motor 102. In another example, if the speed detected from encoder 602 substantially matches the target speed, then controller 310 may maintain the same duty cycle as the previous cycle so as to maintain the desired speed operation.

It will be appreciated that control systems involving motors and doors typically involve sensitive calibration of various components, particularly because motors which operate at speeds which are too high may create a danger for operators and equipment in the vicinity. However, the combination of digital encoder 602, controller 310, power supply circuit 604 and motor 102 may provide for convenient fine-grain control over the speed of motor 102.

For example, given that the output sample frequency of a digital encoder 602 will be thousands, if not more, times per second, the controller 310 will have near-real-time information as to the speed of the motor 102. Moreover, the processor 402 of controller 310 similarly performs millions of computational cycles per second. As such, when controller 310 sends a control signal to activate motor 102 (whether via drive 120 or directly from controller 310 to motor 102), any extreme accelerations or speeds would be detected by encoder 602 and controller 310 within thousandths of a second or less, and the control signals from controller 310 (e.g. the duty cycle of the PWM signal) can be adjusted quickly to moderate any such extreme behaviours. This scale of time frame for detecting and correcting anomalous behaviour may occur well before door 106 will have been able to move any appreciable distance, which may serve to reduce and/or eliminate the possibility of causing damage or danger.

This may be particularly useful in the case of door control system 600, which is power supply "agnostic" and thus can receive different power input signals. Rather than having to perform careful calibration of system 600 whenever the input voltage or type of input voltage signal is modified, power supply circuit 604 together with the feedback loop between encoder 602, controller 310 and motor 102 can ensure that the speed of operation of the motor during door movement remains in the desired range. Similar principles apply to when a door 106 in an existing system is modified (e.g. replacing one or more panels with panels of a different material/weight, which would result in a difference in performance of motor 102 as the load will have changed).

In some embodiments, system 600 may allow for a user to select a plurality of desired speeds. For example, an operator might wish to use one speed for when the door 106 is being moved upward, and a second speed when door 106 is being lowered. In some embodiments, controller 310 may store different speeds for upward and downward movement directions. In some embodiments, controller 310 may store a plurality of different speeds for each of upward and downward movement directions, respectively. For example, controller 310 may store 5 possible speed ratings for upward movement from which the operator can choose. In other embodiments, the operator can specify the desired speed for upward and/or downward movement of door 106 via control panel 114. In still other embodiments, controller 310 may store different speeds dependent upon the position of the door. For example, controller 310 may adjust the speed of door movement to be slower towards the end of the distance range of the door's movement path, relative to the speed of movement in the middle of the distance range of the door's movement path.

It should be appreciated that although FIG. 6 depicts components as being separate, in other embodiments it is contemplated that one or more components may be integrated into one component. As such, the depiction of certain components as separate (e.g. display 302 being separate from controller 310) is merely a simplified example illustration to depict functional aspects of system 600, and not necessarily indicative of the physical location of various components in system 600.

FIG. 9 depicts an alternative embodiment of door control system 600 shown in FIG. 6. As depicted, controller 310 may accept one or more of activation inputs, reversing inputs, a 5 V DC input, position and/or speed data from encoder 602, and electrical current data from drive 120. Further, controller 310 is configured to provide signal outputs, is connected to display module 302 and may provide to drive 120 one or more of a batter/power signal, an open command, a close command, a pulse width-modulated drive command, and/or a pulse width modulated braking command. In some embodiments, drive 120 may have separate pins for receiving each of said inputs from controller 310. In some embodiments, drive 120 may receive one or more of said inputs at a same pin (whether directly substitutable, or via, for example, a multiplexer which allows for a particular one of said inputs to be selected).

Figure 10C:
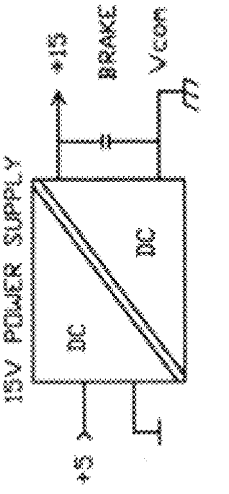
FIG. 10C depicts an example power supply circuit, in accordance with some embodiments.
Figure 10B:
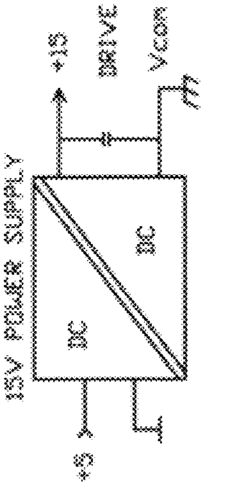
FIG. 10B depicts an example power supply circuit, in accordance with some embodiments.
Figure 10A:
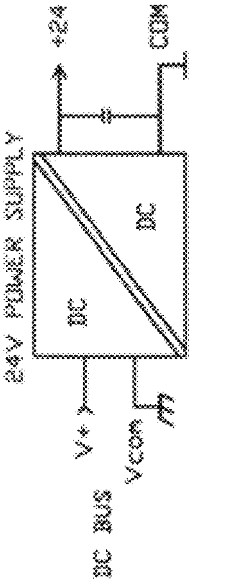
FIG. 10A depicts an example power supply circuit, in accordance with some embodiments.
Figure 11C:
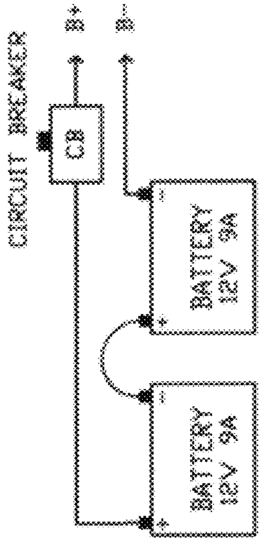
FIG. 11C depicts an example battery power supply circuit, in accordance with some embodiments.
Figure 11B:
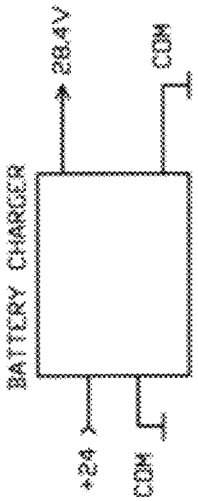
FIG. 11B depicts an example battery charger circuit, in accordance with some embodiments.
Figure 11A:
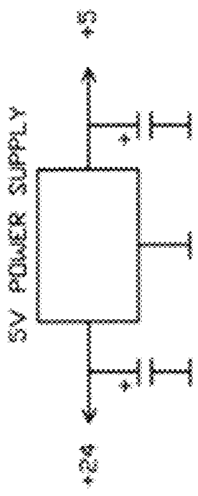
FIG. 11A depicts an example power supply circuit, in accordance with some embodiments.

As depicted in FIG. 9, drive 120 may include a power supply input of +24 V DC (which may be provided, for example, by switcher 702 as depicted in FIG. 10A), a +5 V DC power supply input (which may be provided, for example, by a circuit such as that depicted in FIG. 11A), a +15 V DC power supply input (which may be provided, for example, by the circuit depicted in FIG. 10B using switcher 702) for driving motor 102, a +15 V DC input (which may be provided, for example, by the circuit depicted in FIG. 10C using switcher 702) for braking motor 102, a DC bus voltage input V+(which may be provided, for example, by the circuit depicted in FIG. 7C), and a battery input (which may be provided, for example, by the circuit depicted in FIG. 11C which provides 24 V DC). In some embodiments, the system may include a battery charging circuit (as depicted in FIG. 11B) which may serve to keep batteries at a high state of charge in in the event that battery operation becomes required (e.g. in the case of a power outage). As depicted in the embodiment of FIG. 9, motor 102 is a 180 V DC motor. It will be appreciated that this voltage rating is merely an example and that other motor designs and configurations are contemplated and within the spirit and scope of embodiments described herein. In some embodiments, the input voltage to the system may be 208 V AC to 600 V AC. In some embodiments, the input voltage to the system may be between 110 V AC and 240 V AC.

Figure 12:
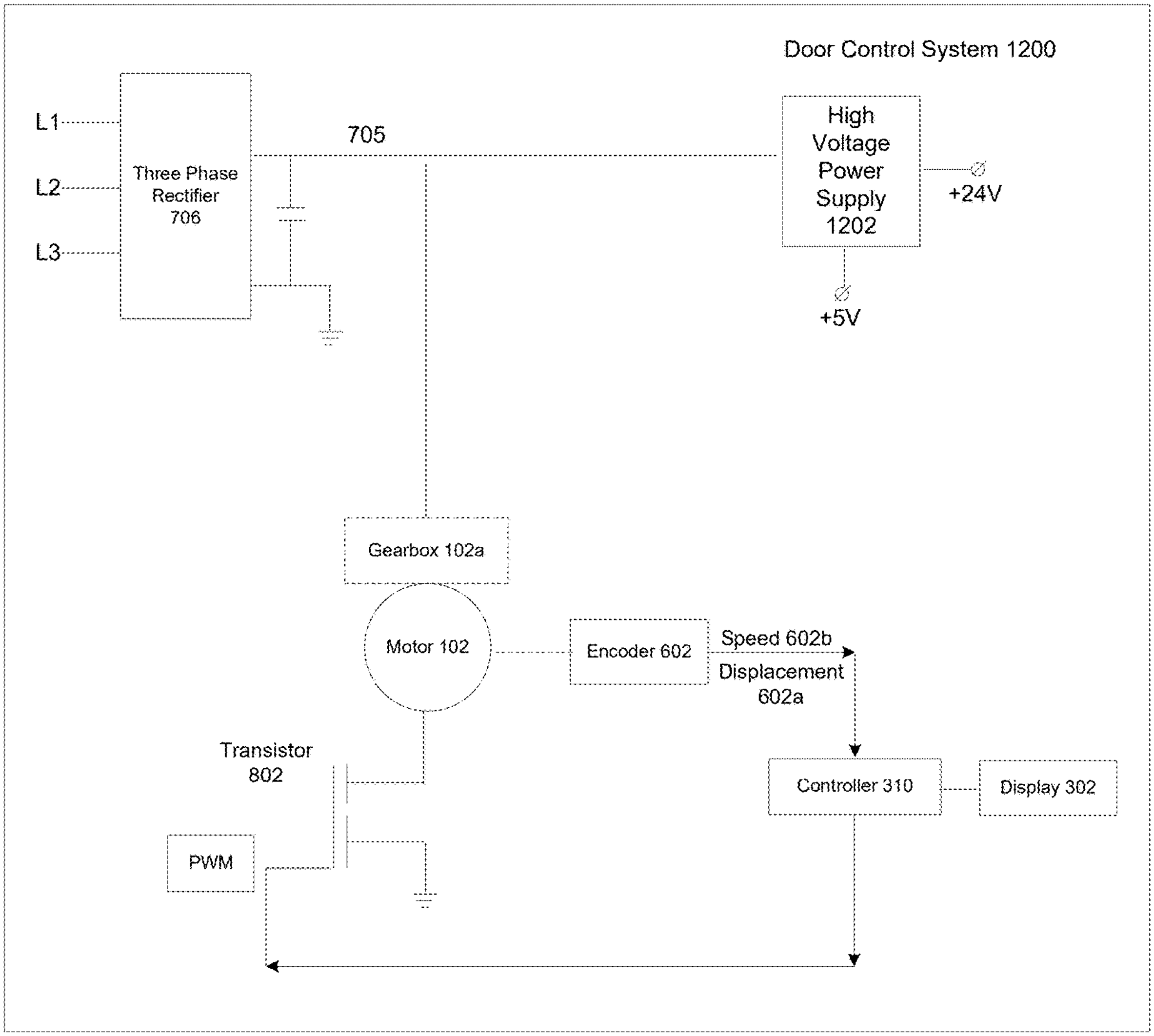
FIG. 12 depicts an example door control system, in accordance with some embodiments.

FIG. 12 depicts components of an example door control system 1200, in accordance with some embodiments. For simplicity, certain components (e.g., lights 116, tilt sensor 124, relay 200, battery 122, and the like) have been omitted from FIG. 12). It should be appreciated that one or more of these components may be present in some embodiments.

As depicted, system 1200 includes a controller 310, a display 302 connected to controller 310, a high voltage power supply 1202 coupled to controller 310 and drive 120 (omitted), (with connections to power buses of +5 V and +24 V DC, which connect to various components such as depicted in FIG. 9 omitted for simplicity). As shown, a motor 102 may be connected to a high voltage DC supply, which is the output from rectifier 706. It should be appreciated that although FIG. 12 depicts rectifier 706 as a three-phase rectifier, in other embodiments a 2 phase rectifier 704 is contemplated.

In some embodiments, the output DC voltage 705 may be between about 250 V and 900 V DC. In some embodiments, the input voltage may be a three-phase source having a voltage range between 208 V (line to line) and 240 V (individual phases). In some embodiments, the input voltage may be a three-phase source having a voltage between 380 V and 480 V. In some embodiments, the input voltage may be a three-phase source having a voltage between 575 V and 600 V. In some embodiments, the frequency of the input voltage may be between 50 Hz and 60 Hz. In the case of a single phase input voltage source, the input voltage may range from 110 V to 240 V. It should be appreciated that these are merely example embodiments which appear frequently in various jurisdictions (e.g. Europe, Canada, and the like), and that various other ranges of input voltage are contemplated and can be used without departing from the principles described herein. Some embodiments described herein may be particularly useful in jurisdictions in which more than one voltage range is common (e.g., in Europe, it is common for residential voltages to be about 220 V, whereas industrial settings may use 380 V. Some embodiments of systems 600, 800, 900, 1200, 1300 described herein may be quickly and easily switched from one input voltage range to another without requiring any calibration by the user, as the speed of the motor 102 and/or door 106 is measured and output by encoder 602, which provides a reliable measurement which is not dependent on the input voltage of the system, as encoder 602 is powered by switcher 702 (e.g., using a 24 V DC signal).

Returning to FIG. 12, an encoder 602 may be coupled to motor 102 and controller 310. Optionally system 1200 may include a gearbox 102*a* coupled to motor 102. The gearbox may provide a gear ratio to motor 102 (e.g., 30:1, 40:1, or the like) so as to convert individual rotations of motor 102 into larger (or smaller) turns.

In some embodiments, encoder 602 is operable to observe and/or measure changes in position, distance and/or speed. Many different types of encoders 602 may be used, such as optical encoders as described herein and as generally commercially available. In some embodiments, an encoder may function, for example, by being coupled to a moving part, such as a shaft of motor 102 or gearbox 102, or a cable, and rotating in tandem with that part. Encoder 602 may be digital and provide outputs including but not limited to position, distance, angular speed (e.g., RPM), and/or linear speed (e.g., inches per second, metres per second, or the like). As noted above, there are many possible ways of determining speed, displacement, position, and the like, using the output from encoder 602.

As depicted, encoder 602 may be coupled to motor 102 and controller 310 so as to form a feedback loop from motor 102 and/or gearbox 102*a* to controller 310. Thus, controller 310 may be provided with a real-time or near real-time linear speed, angular speed, and/or position of door 106. In some embodiments, controller 310 may be configured to control the speed and/or position of door 106 via control systems sent to motor 102 (depicted in FIG. 12 as Pulse Width Modulation (PWM) signals which are fed to a transistor 802.

In some embodiments, system 1200 may accept virtually any input voltage signal and provide electrical isolation from the remaining electrical components of system 1200. In some embodiments, system 1200 may be able to accept an unknown input voltage (or perhaps knowing a vague range of what an input voltage could be). For example, various customers may have different voltage ranges at different sites, locations, and the like. Previously, the use of expensive and complicated transformers with multiple taps would be required to accommodate such variations in voltage. Advantageously, system 1200 may be flexible enough to work with just about any input voltage without the need for complicated transformers or the like. Previously, it was necessary to sell a transformer with an operator box to match the voltage of a given site with the operating voltage range of a door control system, which added expense and complication to the operation of door control systems.

Rather than restricting the input voltage, controller 310 may adjust the duty cycle of a PWM signal to adjust the speed of motor 102 and/or gearbox 102*a* to the desired speed. For example, the output speed signal 602*b* from encoder 602 may be used to calibrate the speed of motor 102 through a feedback loop with controller 310 and fine-tuning the PWM duty cycle until the desired speed target is achieved. In some embodiments, the speed of motor 102 may be displayed on display 302 during operation, whether in angular or linear speed.

In some embodiments, when the input voltage source is a single phase source, the input voltage may be between 110 V and 240 V. It will be appreciated that certain DC motors require an input voltage of 180V, whereas other models require a 90 V DC input. It will be appreciated that for 90 V motors, the duty cycle may be adjusted to provide a 90 V input rather than 180 V.

In some embodiments, as explained above, a system such as, for example, those shown in FIGS. 6, 9, 12 and 13 may be operable to run and maintain a selected or predetermined output speed regardless of the input power signal which is supplied to the system and motor. This may be accomplished by controlling the power which is delivered to motor 102 by continuously adjusting (e.g., via pulse width modulation) the power to ensure that the desired output speed (whether in terms of angular velocity (e.g. RPM) or linear velocity (e.g. inches per second)) is maintained, irrespective of the input power value. Because of this, the need for expensive and cumbersome power transformers is obviated, which greatly simplifies and reduces the expenses associated with the use of power transformers. Moreover, as explained below, some embodiments of the systems depicted in FIGS. 6, 9, 12 and 13 may be able to run and/or brake motor 102 seamlessly as required to maintain the desired output speed. In some embodiments, encoder 602 may be installed on a gearbox (or coupled to motor 102) to provide the door position and speed information to controller 310 about 200 times a second, which provides significant precision and accuracy.

Figure 13:
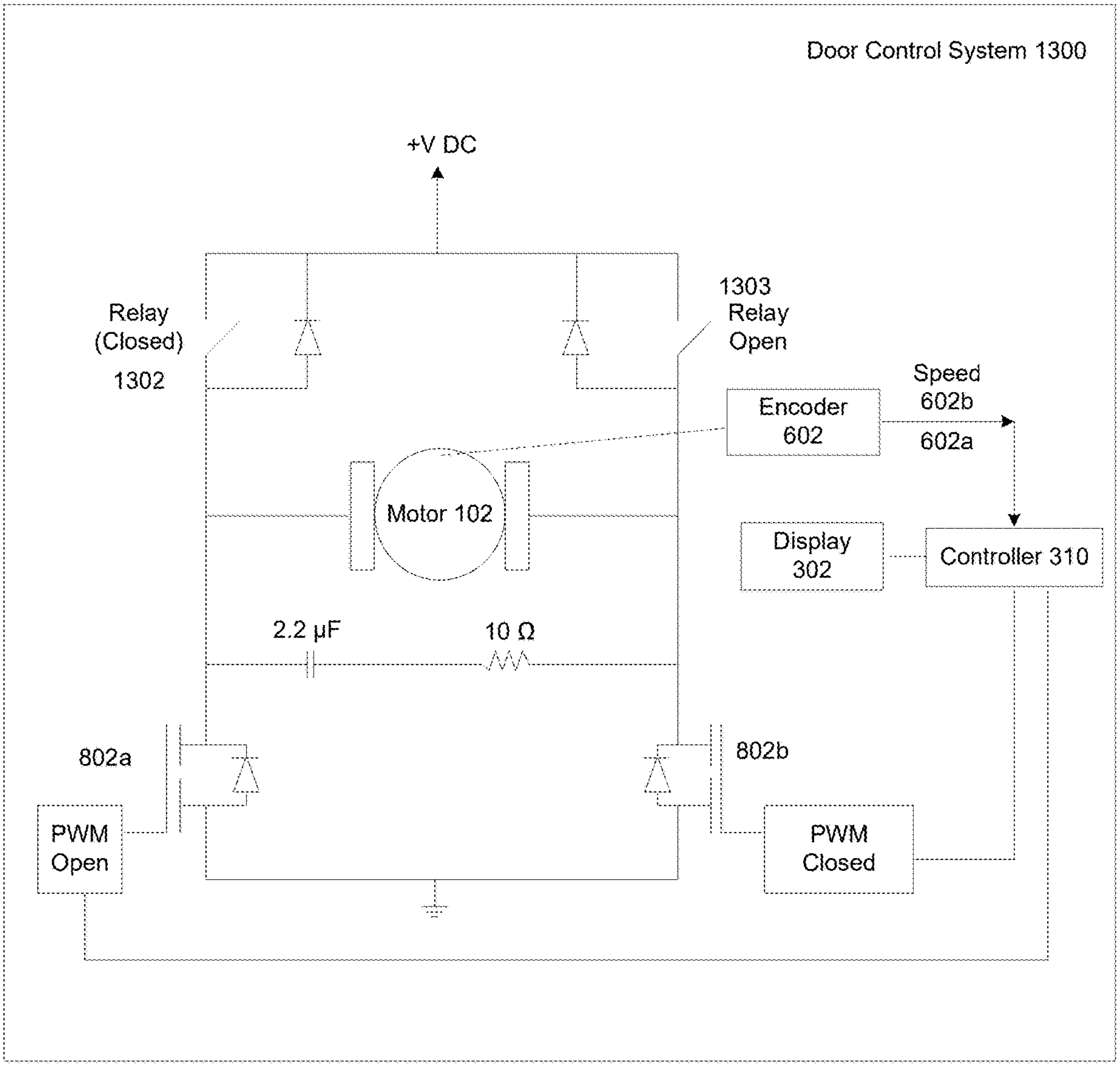
FIG. 13 depicts an example door control system, in accordance with some embodiments.

FIG. 13 depicts an example door control system, in accordance with some embodiments. As depicted, the input DC voltage (depicted as +V DC) may be virtually any DC voltage (e.g. 250 V to 950 V DC). As noted above, the direction of rotation of a DC motor 102 may be reversed by reversing the polarity of the voltage at the terminals. As depicted, system 1300 includes relays 1302 and 1303, which may be opened and closed by controller 310. In some embodiments, relay 1302 may be closed when relay 1303 is open. In some embodiments relay 1302 may be open when relay 1303 is closed. It will be appreciated that the effect of opening relay 1302 and closing relay 1303 would be to effectively reverse the polarity of the input voltage signal at the terminals of motor 102, thereby reversing the direction of rotation of motor 102.

As depicted, system 1300 may include two transistors 802*a*, 802*b*. As depicted, controller 310 may supply PWM signals to transistors 802*a* and/or 802*b*, depending on which combination of relays 1302, 1303 is open and closed, to control the speed of motor 102 for both directions of rotation. As with some embodiments described above, system 1300 may be operable to power motor 102 with an input DC signal (whether received as an input DC signal, or as a rectified 2-phase or 3-phase AC signal) at virtually any input voltage range commonly used in accordance with standards in various jurisdictions worldwide, and the feedback loop between encoder 602, controller 310, and motor 102 and/or transistors 802*a*, 802*b* and relays 1302, 1303 may allow for fine-grain control of speed and direction of movement of motor 102 and/or door 106. Moreover, the use of relays 1302, 1303 may provide a convenient and inexpensive means of switching polarities for a DC motor 102, which enables system 1300 to effect movement of motor 102 in both directions (thereby allowing for the movement of door 106 in both opening and closing directions).

It should be appreciated that although the systems and methods described herein are described in relation to door control systems, such systems may be similarly applicable in other situations in which fine-grain control of motors and/or platforms is required. For example, some embodiments described herein may be useful for loading docks.

In some embodiments, door 106 may be said to be "balanced" when the net force of gravity on door 106 and the tensile force exerted by spring 150 is substantially equal to 0. That is, the net force may be 0, which means door 106 can be moved up and down with minimal effort, and will not drift downwards or upwards when no force is applied. In some embodiments, static friction may compensate for a slightly imperfectly balanced door 106 and spring combination 150.

It is highly desirable to keep a door control system in a balanced or substantially balanced state with spring 150 (or, for example, a counterweight). In a balanced state, the work performed by motor 102 (and therefore the power consumed by motor 102 during operation) is reduced relative to unbalanced states, because less torque and/or force (and therefore less energy in the form of work) needs to be applied by motor 102 to cause door 106 to move. It should also be appreciated that a door system can be unbalanced in either direction. For example, an unbalanced state may result in the gravitational force of door 106 being too high (necessitating more power consumption from motor 102 to lift door 106). However, an unbalanced state may also result in the tensile force provided by spring 150 being higher than the weight of the door, which would bias the door 106 to remain open, requiring more power consumption from motor 102 when closing door 106 in order to overcome the tensile force of spring 150.

It is particularly desirable for door control system 100 to be in a balanced state when battery 122 is providing power (rather than power supply 104). As battery capacity is finite, a properly balanced door control system 100 will extend the life of battery 122. Moreover, a properly balanced door control system will extend the life of spring 150, as spring 150 will not be placed under more tension than is necessary and will be less prone to failure. Torsion springs typically used for garage door systems are quite expensive, and cumbersome to repair, and as such, it is particularly desirable to extend the service life of spring 150 for as long as possible to avoid incurring such expense and inconvenience.

When configuring a door control system 100, particularly in the case of retrofitting a motor/drive system to an existing door setup, it is difficult to determine whether the door system is balanced or not. Frequently, motor 102 operates via a gearbox with a high ratio (e.g. 30:1, 40:1, or the like), and it might not be possible to determine whether door 106 and spring 150 are in balance once various components of the drive system are in place. Moreover, any attempts to manually balance the door 106 and spring 150 based on "eyeballing" may not be accurate or dependable.

In some embodiments, door control system 100 may facilitate balancing door 106 and spring 150. In some embodiments, control panel 114 may be configured to display a draw from motor 102 during operation on LCD 302. For example, LCD 302 may display a value of an electrical current used by motor 102 during operation of opening or closing door 106. A current can be measured, for example, by placing a digital ammeter in between two points of a short circuit to measure current, which is then transmitted to controller 310 via I/O interface 406. In other embodiments, controller 310 may include integrated circuitry for measuring, for example, current at various pins or locations.

In some embodiments, door control system 100 may be balanced by observing the magnitude of current drawn by motor 102 during lifting and closing operations. When the current drawn by motor 102 during a lifting operation is substantially equal to the current drawn by motor 102 during a closing or lowering operation, door control system 100 may be balanced. If the magnitude of current drawn by motor 102 is different during lifting and closing operations, spring 150 may be adjusted to vary the tensile force exerted on door 106. In some embodiments, spring 150 may be modified by increasing or decreasing the number of turns. In some embodiments, spring 150 may be adjusted in quarter turn increments. In some embodiments, a set of lining bars may be used to adjust the number of turns in spring 150 gradually. In some embodiments, controller 310 may be configured to display a message on LCD 302 indicating whether said door control system 100 is balanced. In some embodiments, controller 310 may display a message indicating that an adjustment to spring 150 should be made for greater balance. In some embodiments, a suggested adjustment message may indicate whether to increase or decrease the number of turns in spring 150. In some embodiments, a suggested adjustment message may indicate a particular or approximate number of turns to add or remove from said spring 150 to achieve balance.

A further benefit of the systems and methods described herein is that the tension and/or number of turns in spring 150 may be adjusted whenever necessary. For example, over the lifespan of spring 150, there may be a gradual loss of tension through wear a tear. As described herein, differences in current drawn by motor 102 during lifting and lowering operations displayed on LCD 302 may be easily noticed by the user. As such, a door 106 which was initially balanced correctly can be kept in balance with minimal effort and inconvenience. The ease with which the balance of door control system 100 can be maintained may extend the lifetime of various components relative to conventional door control systems. Moreover, when modifications to other components of door control system 100 are made, it is easy for the user to re-establish a balanced state.

In some embodiments, door control system 100, 600 may be unbalanced. For example, system 100, 600 might not have any spring 150 or counterweight which serves to balance out forces acting on door 106. It will be appreciated that "spring-less" or unbalanced door control systems present unique challenges that are not present in balanced door systems. For example, the net force required to move door 106 upward may be substantially increased due to a greater proportion of the door's weight having to be overcome. Moreover, lowering the door 106 can be risky, as there is a constant gravitational force biasing the door 106 to move downward which may cause door 106 to accelerate faster than desired when being lowered.

In some embodiments, controlling the speed of door 106 during lowering operations may be paramount to the safety of the system. Some prior designs may use complicated setups, such as a variable frequency drive for an AC motor in order to control speed, which requires the use of resistors for dissipating heat during voltage spikes, which presents additional hazards to operations. It would be desirable to control the speed and position of door 106 in an unbalanced or springless system without the need for overly complex and expensive designs.

Figure 8:
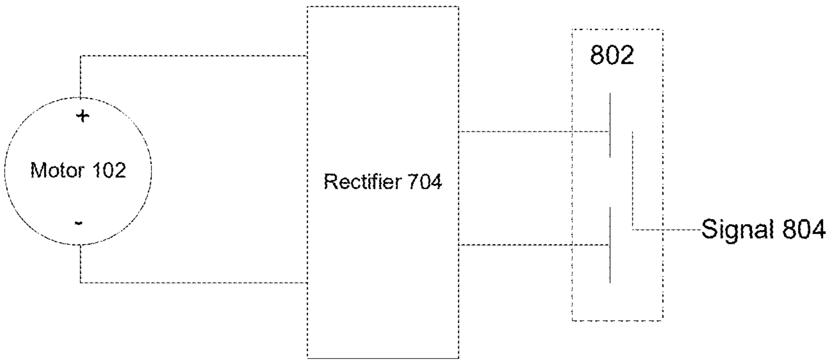
FIG. 8 is a diagram depicting an example system for controlling the speed of a door.

FIG. 8 is a diagram depicting an example system for controlling and/or reducing the speed of a door. As depicted, the terminals of a DC motor 102 are connected to the output 705 of rectifier 704. In some embodiments, rectifier 704 may be a single phase bridge rectifier which converts an input signal to a DC signal. It will be appreciated that to reverse the direction of rotation of a DC motor, the polarity of the input signal may be reversed (as depicted, for example, in FIG. 13).

As depicted, the input signal 804 to rectifier 704 may be passed through a transistor 802. In some embodiments, transistor 802 may be an NMOS transistor, though it will be appreciated that any number of different types of transistors may be used to achieve the desired behavior of the voltage signal sent to motor 102, as described below.

Certain types of motors (such as brushed DC motors) are capable of a phenomenon known as "short braking". That is, in certain types of motors 102 (e.g. a brushed DC motor), it is possible to quickly stop the rotor when it is rotating (e.g. due to inertia after having turned off power) by short circuiting the brushes to apply braking. When the brushes are disconnected from the power supply and the rotor is moving, it has the effect of generating a rotational force that is opposite to the current direction of rotation, which results in braking to the stop the original direction of rotation.

It will be appreciated that as the speed of rotation of motor 102 increases, the magnitude of the current increases. As such, when the terminals are short circuited, the braking force (i.e. the rotational force in the direction opposite to rotation) becomes stronger the faster the motor 102 is rotating. Likewise, the braking force diminishes as the speed of rotation of motor 102 decreases.

In some embodiments, signal 804 provided to transistor 802 may cause a short circuit to occur between the terminals of DC motor 102, thereby providing a braking force to prevent motor 102 from moving (and consequently, preventing door 106 from falling downward). In some embodiments, signal 804 may be a variable signal (e.g. a square wave) which can selectively apply a braking force to control the speed of motor 102 and door 106.

Returning to FIGS. 6, 9, 12 and 13, encoder 602 may constantly be providing displacement 602*a* and speed 602*b* data to controller 310 during operation of system 600. As noted above, this data may be updated hundreds of times per second (e.g. 200 times per second), or even thousands of times per second, depending on the need and/or desire of the designer to exercise precision control over the position and/or speed of door 106. As such, controller 310 is capable of constantly adjusting the signal 804 being sent to drive 120 and/or motor 102 to control the speed and/or position of door 106.

In some embodiments, the signal sent from controller 310 may be operable to cause a short circuit at the terminals of DC motor 102. For example, and particularly in, though not limited to, an unbalanced or springless system, controller 310 may determine that the speed of motor 102 during a downward movement of door 106 is higher than desired or higher than a target downward speed. In some embodiments, controller 310 may be configured to modify the control signal sent to drive 120 and/or motor 102 to activate braking at motor 102 by controlling transistor 802 to create a short circuit condition.

Advantageously, the frequency at which encoder 602 can report position/speed data, and the frequency at which controller 310 can update the control signal sent to drive 120 and/or motor 102 may allow for braking activation to last for very short periods of time (e.g. tenths, hundredths, or thousandths of a second), which may be sufficient to moderate the downward speed of door 106 without causing door 106 or motor 102 to fully stop. As such, the combination of control signals (such as a PWM signal) from controller 310 and the feedback loop between motor 102, encoder 602 and controller 310 may allow for fine-grain control of the speed (also referred to as "variable braking" or "dynamic braking") of door 106 in unbalanced systems. Such braking may be likened to anti-lock braking systems on automobiles, in which the brake of a car is activated in short transient pulses rather than one continuous application of the brake (which may cause undesirable lock-ups and equipment wear, relative to short pulses of braking).

It will be appreciated that although braking motor 102 using transistor 802 and control signal 804 is described with respect to unbalanced systems, it may be similarly incorporated into balanced systems. This may be useful in instances in which a system gradually becomes unbalanced over time (e.g. if spring 150 loses tension over time), and may be a useful fail-safe to prevent door 106 from drifting and/or falling in such instances. Moreover, braking via this method may be useful in situations in which the door movement speed (whether moving upward or downward) exceeds a threshold difference between the target speed and the current speed (and simply reducing the duty cycle of the PWM might not sufficiently reduce the speed within a desired time period). In some embodiments, the braking system depicted in FIG. 8 may be useful as a secondary level of braking while system 600 is disabled or powered down to ensure that motor 102 is not able to rotate in any significant amount. In some embodiments, drive 120 may accept a drive input signal and a braking input signal (as depicted in the example system of FIG. 9).

Some embodiments of the door control system 100 described herein may offer numerous advantages over known door control systems. For example, some embodiments may provide a convenient way of complying with safety standards (e.g. UL 325) with relatively little inconvenience to end users. Further, some embodiments provide for a robust solution for ensuring continued operation during power outages and other unforeseeable circumstances in which power supply 104 is unavailable. Moreover, some embodiments use brushed DC motors, which are relatively inexpensive and simple to control compared to brushless DC motors and AC induction motors. Still further, some embodiments provide for a system which is power supply "agnostic"—that is, virtually any power supply may be used without significant modifications to the system needing to be made, because the input voltage can be transformed to a suitable level. Still further, some embodiments provide for improved control of door movement in both "balanced" and "unbalanced" door systems (i.e. systems in which there is no spring 150 or counterweight for the door, or in which spring 150 is mis-calibrated). Still further, some embodiments provide for a robust mechanism for slowing down or "braking" a door which is ascending or descending at speeds which exceed a target or maximum speed specified for the system.

As noted above in relation to FIG. 5, control panel 114 includes controller 310. Controller 310 may be any suitable computing device, including a microcontroller, a server, a desktop computer, a laptop computer, and the like. Controller 310 includes one or more processors 402 that control the overall operation of controller 310. Processor 402 interacts with several components, including memory 404, storage 408, network interface 410 and input/output interface 406. Processor 402 may interact with components via bus 412. Bus 412 may be one or more of any type of several buses, including a peripheral bus, a video bus, or the like.

Each processor 402 may be any suitable type of processor, such as a central processing unit (CPU) implementing for example an ARM or x86 instruction set. Memory 404 includes any suitable type of system memory that is readable by processor 402, such a static random access memory (SRAM), dynamic random access memory (DRAM), synchronous dynamic RAM (SDRAM), read-only memory (ROM), or a combination thereof. Storage 408 may include any suitable non-transitory storage device configured to store data, programs, and other information and to make the data, programs and other information accessible via bus 412. Storage 408 may comprise, fo example, one or more of a solid state drive, a hard disk drive, a magnetic disk drive, an optical disk drive, a secure digital (SD) memory card, and the like.

I/O interface 406 is capable of communicating with input and output devices such as a display device 302, touch-sensitive devices, touchscreens capable of displaying rendered images as output and receiving input in the form of touches, and buttons 304, 306, 308. Input/output devices may further include, additionally or alternatively, one or more of speakers, microphones, cameras, sensors such as sensors 112 and tilt sensor 124, radio frequency transceivers for receiving and sending commands and acknowledgements to remote control 118, and drive 120. In an example embodiment, I/O interface 406 includes a universal serial bus (USB) controller for connection to peripherals.

Network interface 410 is capable of connecting controller 310 to a communication network. In some embodiments, network interface 410 includes one or more of wired interfaces (e.g. wired ethernet) and wireless radios, such as WiFi, Bluetooth, or cellular (e.g. GPRS, GSM, EDGE, CDMA, LTE, or the like). Network interface 410 enables controller 310 to communicate with other devices, such as a server, via a communications network.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power supply agnostic method of operating a door control system having a motor coupled to a door, the method comprising:

connecting an input voltage source providing an input voltage signal to said door control system, said door control system comprising inputs for two or more of an input DC voltage source, an AC input voltage source, and/or a 3-phase AC input voltage source;

transforming, by a power supply circuit, said input voltage signal to a transformed DC signal having a magnitude suitable for a controller and an encoder coupled to said motor of said door control system;

receiving, at said controller, a target speed for moving said door;

receiving, at said controller, a command for moving said door in a first direction;

effecting movement of said door, wherein effecting movement of said door comprises:

transmitting a control signal to actuate said motor;

receiving, at said controller, from said encoder coupled to said motor, a current speed;

adjusting, by said controller, said control signal based on said target speed and said current speed; and transmitting said adjusted control signal to said motor.

2. The method of claim 1, wherein said input voltage is an Alternating Current (AC) input signal, and wherein said method further comprises converting said AC input signal to a DC input signal.

3. The method of claim 2, further comprising transforming, by a power supply circuit, said DC input signal to said transformed DC signal having a magnitude suitable for at least one of said controller and/or said encoder.

4. The method of claim 1, wherein adjusting said control signal comprises one of:

increasing an average magnitude of said control signal when said current speed is less than said target speed; and decreasing an average magnitude of said control signal when said current speed is greater than said target speed.

5. The method of claim 1, wherein said motor is a DC motor, and said DC motor comprises a switching element configured to switch to a short circuit condition at terminals of said motor, and wherein said controller is configured to activate said switching element to effect braking when a magnitude of said current speed exceeds said target speed by greater than a threshold amount.

6. The method of claim 2, wherein said DC input signal has a range of 50 V to 1000 V DC.

7. The method of claim 2, wherein said transformed DC signal has a magnitude of 24 V.

8. The method of claim 2, wherein said input voltage is a three-phase AC signal, and said three-phase AC signal has voltages between 208 V and 600 V.

9. The method of claim 1, further comprising:

after said transmitting of said adjusted control signal to said motor, receiving, at said controller, a subsequent current speed; and adjusting said control signal based on said target speed and said subsequent current speed.

10. The method of claim 5, further comprising:

after said transmitting of said adjusted control signal, receiving, at said controller, a subsequent current speed, and wherein said controller is configured to deactivate said switching element to remove said short circuit condition based on said subsequent current speed and said target speed.

11. The method of claim 1, further comprising displaying said current speed on a display coupled to said controller.

12. The method of claim 1, wherein said current speed is one of a linear speed and angular speed.

13. The method of claim 4, wherein increasing said average magnitude of said control signal comprises adjusting a duty cycle of said control signal.

14. The method of claim 3, wherein said DC input signal is provided to said motor.

15. A power supply agnostic door control system comprising:

a door;

a motor coupled to said door;

an encoder coupled to said door;

a controller configured to:

receive a command to move said door;

transmit a control signal to actuate said motor to effect movement of said door;

receive a current speed of said door from said encoder;

adjust said control signal based on said current speed and a target speed; and transmit said adjusted control signal to said motor;

inputs for two or more of an input DC voltage source, an AC input voltage source, and/or a 3-phase AC input voltage source;

a power supply circuit configured to transform an input voltage signal selected from one of said input DC voltage source, said AC input voltage source, and said 3-phase AC input volage source to a transformed DC signal having a magnitude suitable for said controller and said encoder.

16. The door control system of claim 15, wherein the power supply circuit is configured to isolate said door control system components from said input voltage.

17. The door control system of claim 15, wherein said adjusting said control signal comprises one of:

increasing an average magnitude of said control signal when said current speed is less than said target speed; and decreasing an average magnitude of said control signal when said current speed is greater than said target speed.

18. The door control system of claim 15, further comprising a switching element configured to, when activated, cause a short circuit condition at terminals of said motor to effect braking.

19. The door control system of claim 18, wherein said controller is configured to activate said switching element when a magnitude of said current speed exceeds said target speed by greater than a threshold amount.

* * * * *